US012656448B2

(12) United States Patent
Kalantari et al.

(10) Patent No.: US 12,656,448 B2
(45) Date of Patent: Jun. 16, 2026

(54) CO-EXISTENCE OPERATIONS INVOLVING A RADAR-ENABLED USER EQUIPMENT AND OTHER USER EQUIPMENTS

(71) Applicant: Telefonaktiebolaget LM Ericsson (publ), Stockholm (SE)

(72) Inventors: Ashkan Kalantari, Malmö (SE); Gang Zou, Lund (SE); Fredrik Dahlgren, Lund (SE); Andres Reial, Höllviken (SE); Magnus Sandgren, Staffanstorp (SE); Henrik Sjöland, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 652 days.

(21) Appl. No.: 18/012,312

(22) PCT Filed: Jul. 10, 2020

(86) PCT No.: PCT/EP2020/069503
§ 371 (c)(1),
(2) Date: Dec. 22, 2022

(87) PCT Pub. No.: WO2022/008066
PCT Pub. Date: Jan. 13, 2022

(65) Prior Publication Data
US 2023/0314554 A1 Oct. 5, 2023

(51) Int. Cl.
G01S 7/00 (2006.01)
G01S 7/02 (2006.01)
(Continued)

(52) U.S. Cl.
CPC .............. G01S 7/003 (2013.01); G01S 13/42 (2013.01); G01S 13/878 (2013.01); G01S 7/023 (2013.01)

(58) Field of Classification Search
CPC ........ G01S 7/003; G01S 13/42; G01S 13/878; G01S 7/023; H04W 52/242; H04W 16/28;
(Continued)

(56) References Cited

U.S. PATENT DOCUMENTS

| | | | | |
|---|---|---|---|---|
| 4,435,707 | A | * 3/1984 | Clark | .................... G01S 13/953 342/26 B |
| 4,973,964 | A | * 11/1990 | Schuster | ................. G01S 13/68 342/359 |

(Continued)

FOREIGN PATENT DOCUMENTS

| | | | |
|---|---|---|---|
| EP | 0548309 A1 | 6/1993 | |
| EP | 3758143 A1 | * 12/2020 | ............. G06F 30/20 |

(Continued)

OTHER PUBLICATIONS

Afzal, et al., "Real time rainfall estimation using microwave signals of cellular 1 communication networks: a Case Study of Faisalabad, Pakistan", Hydrol. Earth Syst. Sci. Discuss., https://doi.org/10.5194/hess-2017-740, Manuscript under review for journal Hydrol. Earth Syst. Sci., Jan. 15, 2018.
(Continued)

*Primary Examiner* — Nuzhat Pervin
(74) *Attorney, Agent, or Firm* — Murphy, Bilak & Homiller, PLLC

(57) ABSTRACT

A radar-enabled wireless communication device (12) is configured for exchanging communication signals with a wireless communication network (10) and for performing radar transmissions for surrounding-environment sensing. The device (12) classifies radar beam directions (30) as restricted or unrestricted, based on known or estimated interference with Uplink (UL) reception operations of the network (10) and adapts its radar transmissions based on the classifications. Classification operations may be autono-
(Continued)

mous, without requiring explicit network support, or may be based on one or radio network nodes (22) of the network (10) performing supporting procedures. Updating the classifications depends on, for example, one or more triggering conditions, such as changes in the position or orientation of the device (12), transmit-frequency changes, and changes in ambient conditions, such as the presence or intensity of rain.

20 Claims, 11 Drawing Sheets

(51) Int. Cl.
  *G01S 13/42* (2006.01)
  *G01S 13/87* (2006.01)
(58) Field of Classification Search
  CPC .............. H04W 52/247; H04W 52/383; H04B 7/0695; H04B 7/0608; H04B 7/0617
  See application file for complete search history.

(56) References Cited

U.S. PATENT DOCUMENTS

| | | | | |
|---|---|---|---|---|
| 6,429,804 | B1 * | 8/2002 | Kishida | G01S 13/34 |
| | | | | 342/146 |
| 6,847,690 | B1 * | 1/2005 | Sahlin | H04L 7/042 |
| | | | | 455/67.11 |
| 7,151,479 | B2 * | 12/2006 | Beez | H01Q 1/3233 |
| | | | | 342/174 |
| 9,055,474 | B2 * | 6/2015 | Heo | H04W 72/20 |
| 9,091,759 | B1 * | 7/2015 | Sishtla | G01S 13/28 |
| 9,476,974 | B2 * | 10/2016 | Nagy | G01S 13/878 |
| 9,686,789 | B2 * | 6/2017 | Gormley | G01S 7/2813 |
| 10,061,024 | B1 * | 8/2018 | Fersdahl | G01S 13/953 |
| 10,439,743 | B2 * | 10/2019 | Tercero Vargas ... | H04W 72/542 |
| 10,564,256 | B2 * | 2/2020 | West | G01S 13/44 |
| 10,567,972 | B2 * | 2/2020 | Ghosh | H04W 48/02 |
| 10,641,885 | B2 * | 5/2020 | Frick | G01S 13/882 |
| 11,228,982 | B2 | 1/2022 | Gubeskys et al. | |
| 11,259,158 | B2 * | 2/2022 | Hareuveni | G08B 5/36 |
| 11,375,543 | B2 | 6/2022 | Sanderovich et al. | |
| 11,509,441 | B2 * | 11/2022 | Pajona | H04B 7/0689 |
| 11,902,932 | B2 * | 2/2024 | Yoshioka | H04W 4/46 |
| 11,974,267 | B2 * | 4/2024 | Yoshioka | H04W 72/542 |
| 12,063,603 | B2 * | 8/2024 | Osawa | H04W 56/002 |
| 2004/0145513 | A1 * | 7/2004 | Katayama | G01S 13/426 |
| | | | | 342/107 |
| 2006/0055587 | A1 * | 3/2006 | Mitsumoto | G01S 13/42 |
| | | | | 342/107 |
| 2013/0321200 | A1 * | 12/2013 | Henderson | G01S 13/589 |
| | | | | 342/26 D |
| 2014/0254494 | A1 | 9/2014 | Clegg | |
| 2016/0047907 | A1 * | 2/2016 | Izadian | H01Q 3/2605 |
| | | | | 342/368 |
| 2016/0223665 | A1 * | 8/2016 | Winstead | G01S 13/882 |
| 2017/0026847 | A1 * | 1/2017 | Farshchian | G01S 7/021 |
| 2017/0041038 | A1 * | 2/2017 | Kirkpatrick | H04B 1/48 |
| 2017/0094651 | A1 * | 3/2017 | Green | H04W 16/14 |
| 2017/0195887 | A1 * | 7/2017 | Jovancevic | H04W 4/021 |
| 2017/0212215 | A1 * | 7/2017 | Hellinger | G01S 13/931 |
| 2017/0318470 | A1 * | 11/2017 | Srikanteswara .... | H04W 52/367 |

| | | | | |
|---|---|---|---|---|
| 2018/0102827 | A1 * | 4/2018 | Noh | H04B 7/088 |
| 2018/0199377 | A1 * | 7/2018 | Sanderovich | G01S 7/023 |
| 2019/0181981 | A1 * | 6/2019 | Hwang | H04L 1/20 |
| 2019/0195985 | A1 | 6/2019 | Lin et al. | |
| 2019/0208387 | A1 * | 7/2019 | Jiang | H04W 4/46 |
| 2019/0285729 | A1 * | 9/2019 | Tietze | G01S 7/4026 |
| 2019/0293781 | A1 * | 9/2019 | Bolin | G01S 13/003 |
| 2019/0379439 | A1 * | 12/2019 | Bolin | H04B 7/0617 |
| 2019/0393944 | A1 * | 12/2019 | Huang | H04B 7/0695 |
| 2020/0003867 | A1 * | 1/2020 | Arbabian | G01S 7/003 |
| 2020/0025265 | A1 | 1/2020 | Hedman | |
| 2020/0036487 | A1 * | 1/2020 | Hammond | H04L 5/0012 |
| 2020/0150263 | A1 * | 5/2020 | Eitan | G01S 13/10 |
| 2020/0184788 | A1 * | 6/2020 | Emmanuel | H04W 12/122 |
| 2020/0187126 | A1 * | 6/2020 | Bolin | G01S 7/021 |
| 2020/0314764 | A1 * | 10/2020 | Noh | H04B 7/0617 |
| 2020/0322962 | A1 * | 10/2020 | Wang | H04W 72/21 |
| 2020/0358207 | A1 * | 11/2020 | Baur | H01Q 21/0075 |
| 2020/0363499 | A1 * | 11/2020 | Mayer | G01S 13/87 |
| 2021/0116560 | A1 * | 4/2021 | Gulati | G01S 13/87 |
| 2021/0165070 | A1 * | 6/2021 | Mayer | G01S 7/003 |
| 2021/0211348 | A1 * | 7/2021 | Li | H04W 24/08 |
| 2021/0231771 | A1 * | 7/2021 | Bengtsson | H04B 7/06966 |
| 2022/0013885 | A1 * | 1/2022 | Yang | B60R 19/483 |
| 2022/0196798 | A1 * | 6/2022 | Chen | G01S 7/354 |
| 2022/0376816 | A1 * | 11/2022 | Yoshioka | H04L 1/0016 |
| 2023/0314601 | A1 * | 10/2023 | Grard | G01S 7/027 |
| | | | | 342/70 |
| 2024/0385284 | A1 * | 11/2024 | Renaud | G01S 7/03 |

FOREIGN PATENT DOCUMENTS

| | | | | |
|---|---|---|---|---|
| GB | 2570389 | A | 7/2019 | |
| WO | 2010101003 | A1 | 9/2010 | |
| WO | 2013106740 | A2 | 7/2013 | |
| WO | 2013106740 | A3 | 9/2013 | |
| WO | 2015130336 | A1 | 9/2015 | |
| WO | 2019001160 | A1 | 1/2019 | |
| WO | 2019187423 | A1 | 10/2019 | |
| WO | 2019233830 | A1 | 12/2019 | |
| WO | 2020018179 | A1 | 1/2020 | |
| WO | WO-2020096960 | A1 * | 5/2020 | ............ G01S 13/10 |
| WO | 2021028056 | A1 | 2/2021 | |
| WO | 2021028057 | A1 | 2/2021 | |
| WO | 2022008372 | A1 | 1/2022 | |

OTHER PUBLICATIONS

Chiang, Mung et al., "Power Control in Wireless Celllular Networks", Foundations and Trends in Networking, sample, 2008, 1-160.

Niu, et al., "A Survey of Millimeter Wave (mmWave) Communications for 5G: Opportunities and Challenges", Springer Wireless Networks, vol. 21, No. 8, Feb. 25, 2015, 17 pages.

Qi, et al., "Three-dimensional millimetre-wave beam tracking based on smart phone sensor measurements and direction of arrival/time of arrival estimation for 5G networks", IET Microwaves, Antennas & Propagation, vol. 12, No. 3, 2018, 9 pages.

Rasool, I., et al., "RSSI-based Positioning in Unknown Path-Loss Model for WSN", Sensor Signal Processing for Defence, IEEE, XP032433717, Sep. 25, 2012, 1-5.

Dahlman, Erik , et al., "5G NR: The Next Generation Wireless Access Technology", Academic Press, 2018, 469 pages.

\* cited by examiner

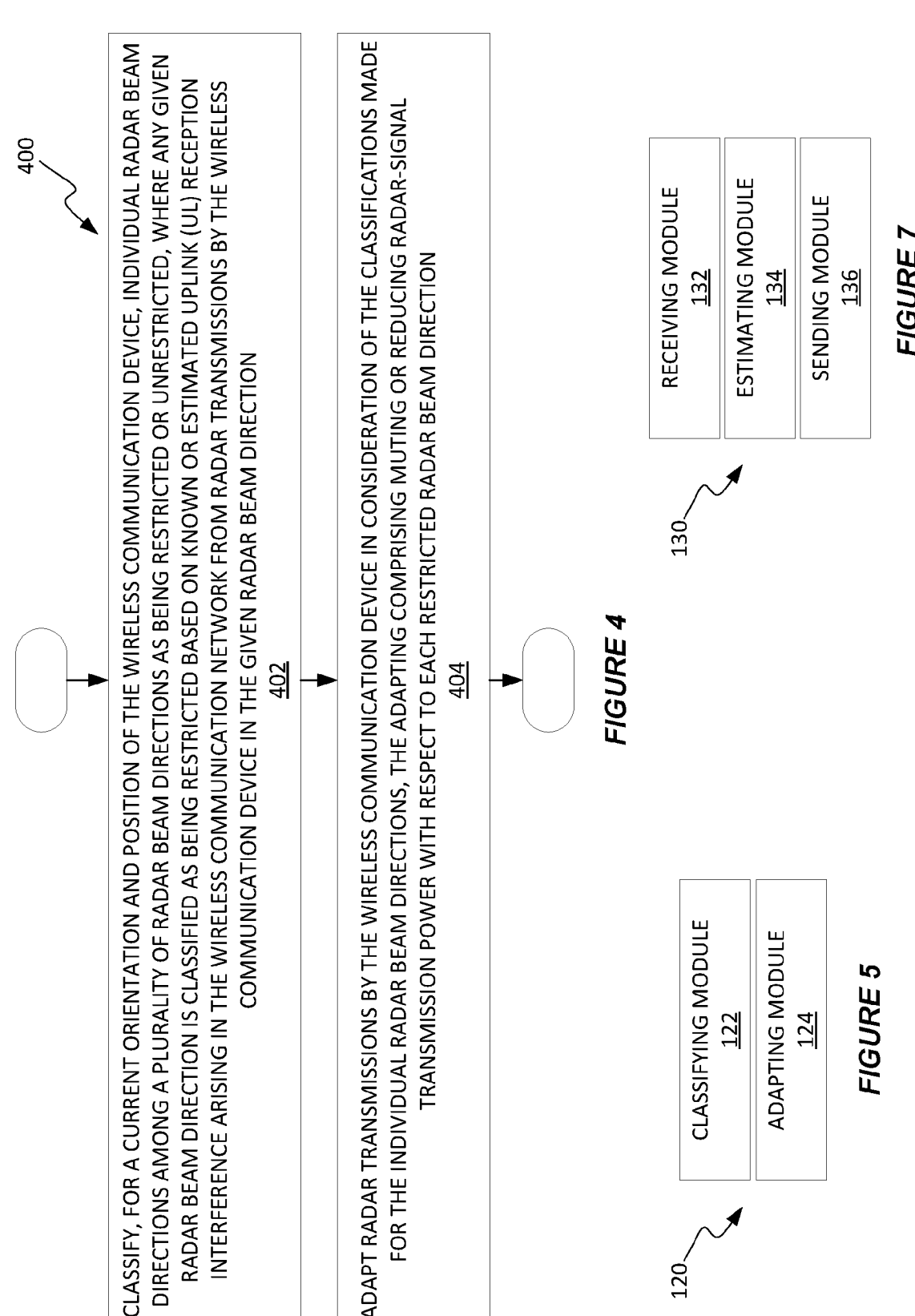

400

CLASSIFY, FOR A CURRENT ORIENTATION AND POSITION OF THE WIRELESS COMMUNICATION DEVICE, INDIVIDUAL RADAR BEAM DIRECTIONS AMONG A PLURALITY OF RADAR BEAM DIRECTIONS AS BEING RESTRICTED OR UNRESTRICTED, WHERE ANY GIVEN RADAR BEAM DIRECTION IS CLASSIFIED AS BEING RESTRICTED BASED ON KNOWN OR ESTIMATED UPLINK (UL) RECEPTION INTERFERENCE ARISING IN THE WIRELESS COMMUNICATION NETWORK FROM RADAR TRANSMISSIONS BY THE WIRELESS COMMUNICATION DEVICE IN THE GIVEN RADAR BEAM DIRECTION
402

ADAPT RADAR TRANSMISSIONS BY THE WIRELESS COMMUNICATION DEVICE IN CONSIDERATION OF THE CLASSIFICATIONS MADE FOR THE INDIVIDUAL RADAR BEAM DIRECTIONS, THE ADAPTING COMPRISING MUTING OR REDUCING RADAR-SIGNAL TRANSMISSION POWER WITH RESPECT TO EACH RESTRICTED RADAR BEAM DIRECTION
404

*FIGURE 4*

RECEIVING MODULE
132

ESTIMATING MODULE
134

SENDING MODULE
136

CLASSIFYING MODULE
122

ADAPTING MODULE
124

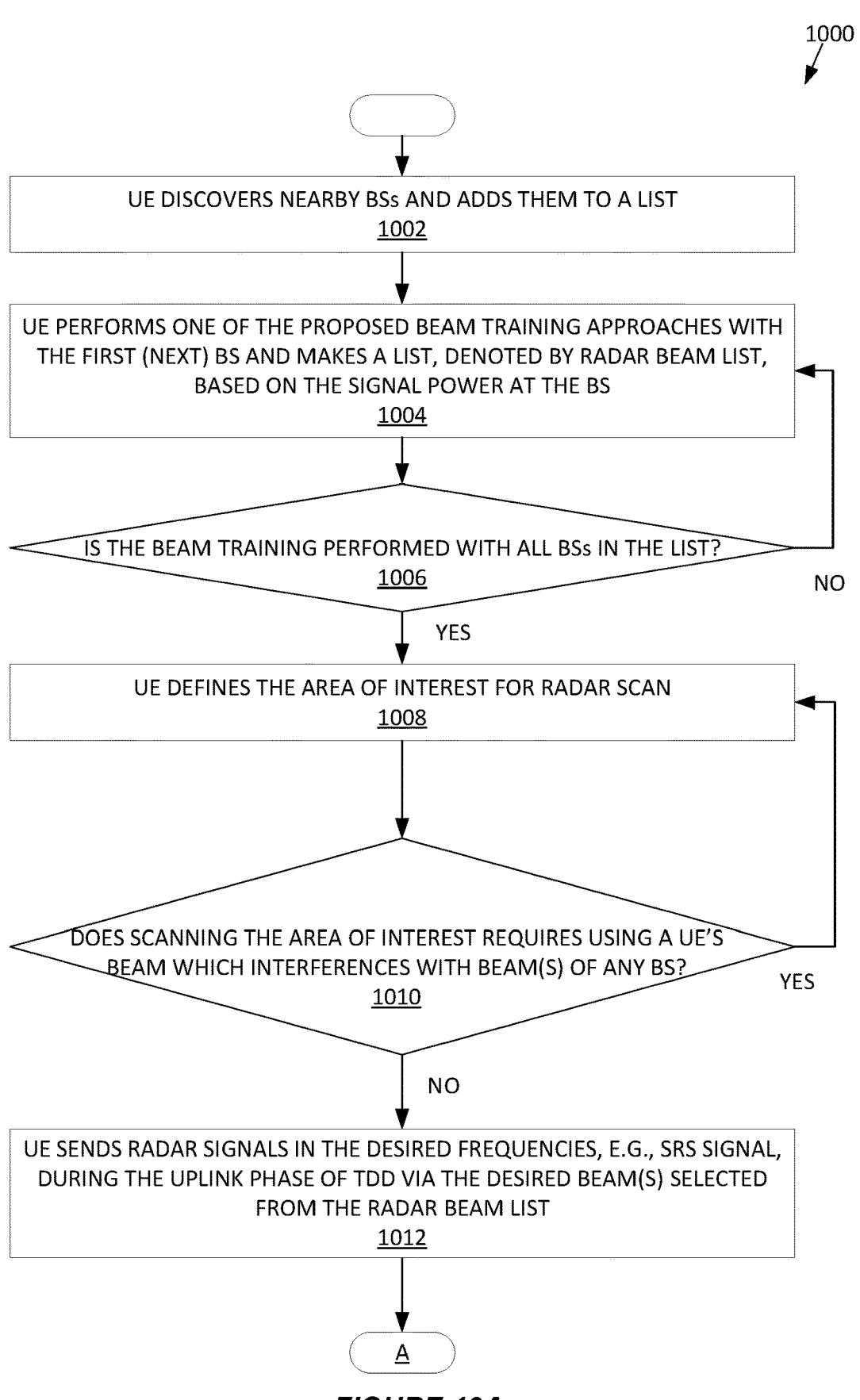

1000

UE DISCOVERS NEARBY BSs AND ADDS THEM TO A LIST
1002

UE PERFORMS ONE OF THE PROPOSED BEAM TRAINING APPROACHES WITH THE FIRST (NEXT) BS AND MAKES A LIST, DENOTED BY RADAR BEAM LIST, BASED ON THE SIGNAL POWER AT THE BS
1004

IS THE BEAM TRAINING PERFORMED WITH ALL BSs IN THE LIST?
1006

NO

YES

UE DEFINES THE AREA OF INTEREST FOR RADAR SCAN
1008

DOES SCANNING THE AREA OF INTEREST REQUIRES USING A UE'S BEAM WHICH INTERFERENCES WITH BEAM(S) OF ANY BS?
1010

YES

NO

UE SENDS RADAR SIGNALS IN THE DESIRED FREQUENCIES, E.G., SRS SIGNAL, DURING THE UPLINK PHASE OF TDD VIA THE DESIRED BEAM(S) SELECTED FROM THE RADAR BEAM LIST
1012

CO-EXISTENCE OPERATIONS INVOLVING A RADAR-ENABLED USER EQUIPMENT AND OTHER USER EQUIPMENTS

TECHNICAL FIELD

The present disclosure relates to radar-enabled user equipments and, specifically, to coexistence operations involving radar-enabled user equipments.

BACKGROUND

Adopting millimeter wave (mmW) frequency ranges for wireless communication networks allows using more antennas with smaller distances, which provides various advantages, including the ability to perform beamforming at the User Equipments (UEs). As a result, device manufactures are equipping UEs, such as those configured for use with communication networks based on Fifth Generation (5G) New Radio (NR) specifications, with antenna panels. Antenna panels can be installed in different locations within a UE and face different directions. In addition, each antenna panel generates different beams depending on the spatial filtering used. Panel orientation changes when the orientation of the UE changes.

The same or similar frequency ranges may be used for radar probing, wherein one or more UEs use radar transmissions for sensing their surrounding environments. As one example, radar probing facilitates autonomous navigation by mobile robots or Autonomous Guided Vehicles (AGVs). As another example, radar probing allows UEs to detect walls or other obstructions proximate to their current position, which may interfere with communications or other operations.

UEs performing radar probing in the same or overlapping mmW frequency range(s) used by wireless communication networks raises the potential for significant interference between radar transmissions and communication transmissions. Such UEs are referred to as "radar-enabled UEs", to denote a wireless communication device that is configured for accessing and using a wireless communication network and further configured to perform radar probing of its surrounding environment.

As used herein, the term "radar" refers to a type of sensing in which one or more radiofrequency signals are transmitted (by one or more transmitters) into a sensing environment, and reflections of those signals received (by one or more receivers). An analysis of the received reflection signals provides information about objects that the signals reflected off of in the sensing environment.

Regarding the operation of radar-enabled UEs, U.S. Pub. 2019/0293781 A1 proposes using separate (orthogonal) resources of a radio channel for transmitting communication signals versus radar signals. While U.S. Pub. 2017/0318470 A1 also considers radar, it more broadly addresses different networks operating in the same shared spectrum, rather than the challenges associated with having radar-enabled UEs operating in a wireless communication network. Similarly, U.S. Pat. No. 10,439,743 B2 addresses radar in the context of wireless communication systems coexisting with, for example, automotive radar systems.

SUMMARY

A radar-enabled wireless communication device is configured for exchanging communication signals with a wireless communication network and for performing radar transmissions for surrounding-environment sensing. The device classifies radar beam directions as restricted or unrestricted, based on known or estimated interference with Uplink (UL) reception operations of the network and adapts its radar transmissions based on the classifications. Classification operations may be autonomous, without requiring explicit network support, or may be based on one or more radio network nodes of the network performing supporting procedures. Updating the classifications depends on, for example, one or more triggering conditions, such as changes in the position or orientation of the device, transmit-frequency changes, and changes in ambient conditions, such as the presence or intensity of rain.

In one embodiment, a method of operation is performed by a wireless communication device that communicates with a wireless communication network and performs radar transmissions for surrounding-environment sensing using a same or overlapping millimeter wave (mmW) frequency range. The method includes classifying, for a current orientation and position of the device, individual radar beam directions among a plurality of radar beam directions as being restricted or unrestricted, where any given radar beam direction is classified as being restricted based on known or estimated UL reception interference arising in the network from radar transmissions by the device in the given radar beam direction. The method further includes adapting radar transmissions by the device in consideration of the classifications made for the individual radar beam directions. The adapting includes muting or reducing radar-signal transmission power with respect to each restricted radar beam direction.

In another embodiment, a wireless communication device is configured for communicating with a wireless communication network and performing radar transmissions for surrounding-environment sensing using a same or overlapping mmW frequency range. The device includes communication circuitry configured for wireless communications with respect to the network and for radar transmissions, and further includes processing circuitry that is operatively associated with the communication circuitry. The processing circuitry is configured to classify, for a current orientation and position of the device, individual radar beam directions among a plurality of radar beam directions as being restricted or unrestricted, where any given radar beam direction is classified as being restricted based on known or estimated UL reception interference arising in the network from radar transmissions by the device in the given radar beam direction. Further, the processing circuitry is configured to adapt radar transmissions by the device in consideration of the classifications made for the individual radar beam directions, where the adapting includes muting or reducing radar-signal transmission power with respect to each restricted radar beam direction.

In another embodiment, a wireless communication device is configured for communicating with a wireless communication network and performing radar transmissions for surrounding-environment sensing using a same or overlapping mmW frequency range. The device includes a classifying module or unit that is configured to classify, for a current orientation and position of the device, individual radar beam directions among a plurality of radar beam directions as being restricted or unrestricted, where any given radar beam direction is classified as being restricted based on known or estimated UL reception interference arising in the network from radar transmissions by the device in the given radar beam direction. Further, the device includes an adapting module or unit that is configured to adapt radar transmissions by the device in consideration of the classifications made for the individual radar beam directions, where the adapting includes muting or reducing radar-signal transmission power with respect to each restricted radar beam direction.

As a further embodiment, a method performed by a radio network node of a wireless communication network includes receiving UL reference-signal transmissions corresponding to respective UL transmit beam directions at a wireless communication device, estimating UL received powers for the UL reference-signal transmissions, and sending feedback for the device. The feedback indicates the UL received powers corresponding to one or more of the UL transmit beam directions. The node performs the method, for example, as a supporting procedure for a radar beam classification procedure performed at the device, in response to receiving initiation signaling from the device.

In a related embodiment, a radio network node configured for operation in a wireless communication network includes communication circuitry and processing circuitry. The processing circuitry is configured to receive UL reference-signal transmissions corresponding to respective UL transmit beam directions at a wireless communication device, estimate UL received powers for the UL reference-signal transmissions, and send feedback for the device. The feedback indicates the UL received powers corresponding to one or more of the UL transmit beam directions. The processing circuitry performs the receive, estimate, and send operations, for example, as a supporting procedure for a radar beam classification procedure performed at the device, in response to receiving initiation signaling from the device.

In another embodiment, a radio network node configured for operation in a wireless communication network includes a receiving module or unit that is configured to receive UL reference-signal transmissions corresponding to respective UL transmit beam directions at a wireless communication device. Further, the node includes an estimating module or unit that is configured to estimate UL received powers for the UL reference-signal transmissions, and a sending module or unit that is configured to send feedback for the device. The feedback indicates the UL received powers corresponding to one or more of the UL transmit beam directions. The node performs the receive, estimate, and send operations, for example, as a supporting procedure for a radar beam classification procedure performed at the device, in response to receiving initiation signaling from the device.

Of course, the present invention is not limited to the above features and advantages. Indeed, those skilled in the art will recognize additional features and advantages upon reading the following detailed description, and upon viewing the accompanying drawings.

4

FIG. 4 is a logic flow diagram of one embodiment of a method of operation by a radar-enabled wireless communication device.

FIG. 5 is a block diagram of another embodiment of radar-enabled wireless communication device.

Figure 6:
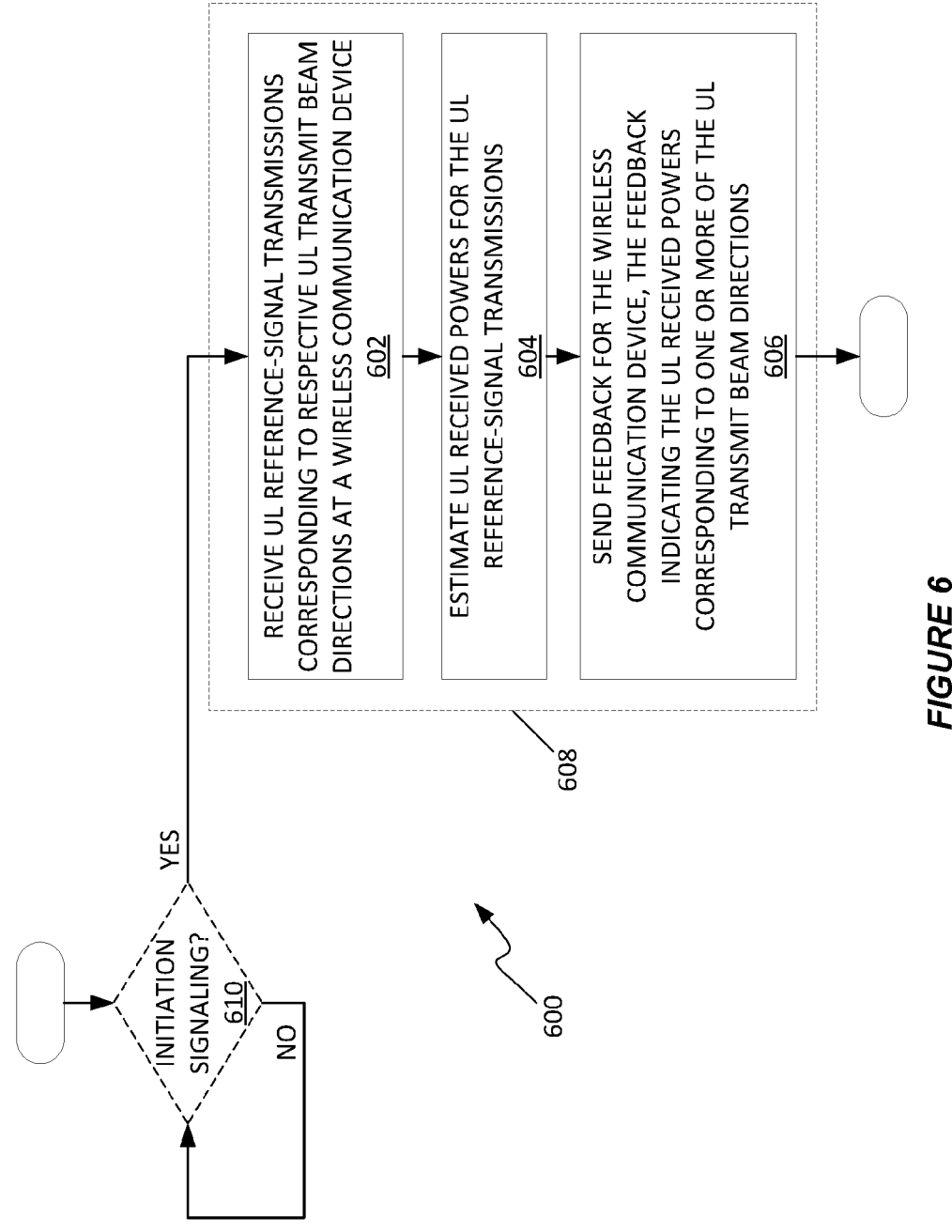

FIG. 6 is a logic flow diagram of one embodiment of a method of operation by a radio network node.

FIG. 7 is a block diagram of another embodiment of radio network node.

Figure 8:
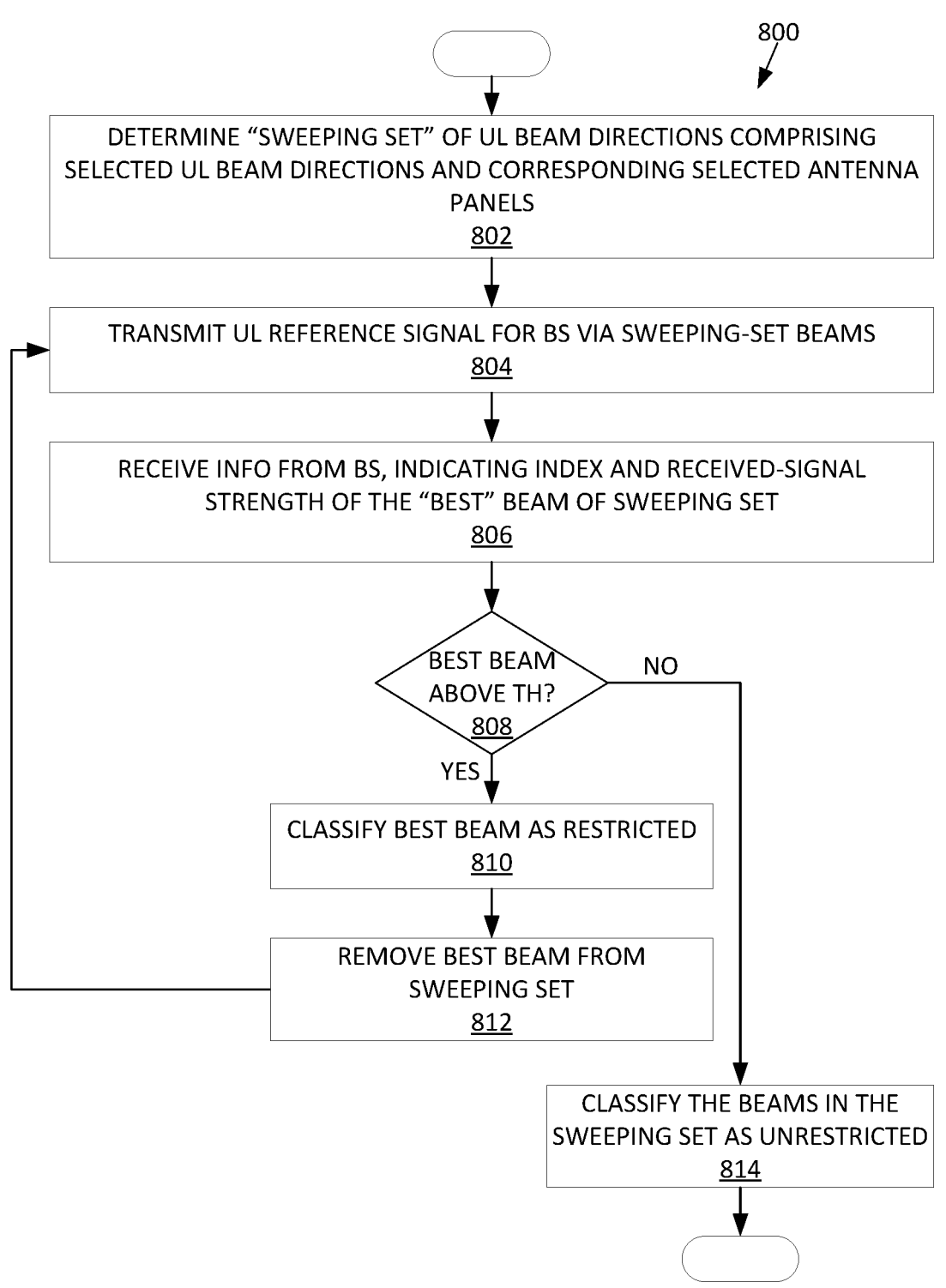
Figure 9A:
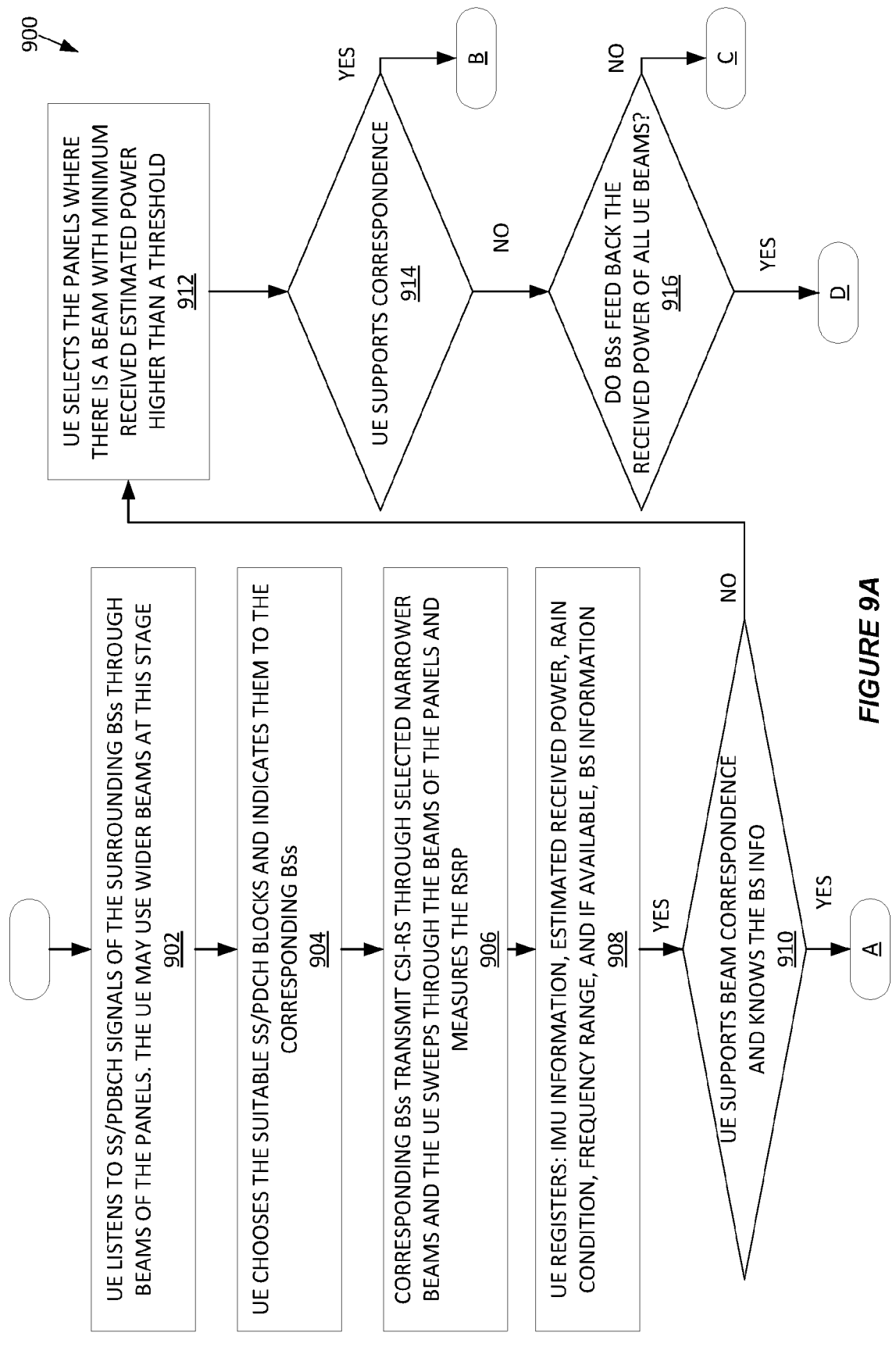

FIGS. 8, 9A/B, and 10A/B/C are logic flow diagrams of further embodiments of a method of operation by a radar-enabled wireless communication device.

DETAILED DESCRIPTION

Figure 1:
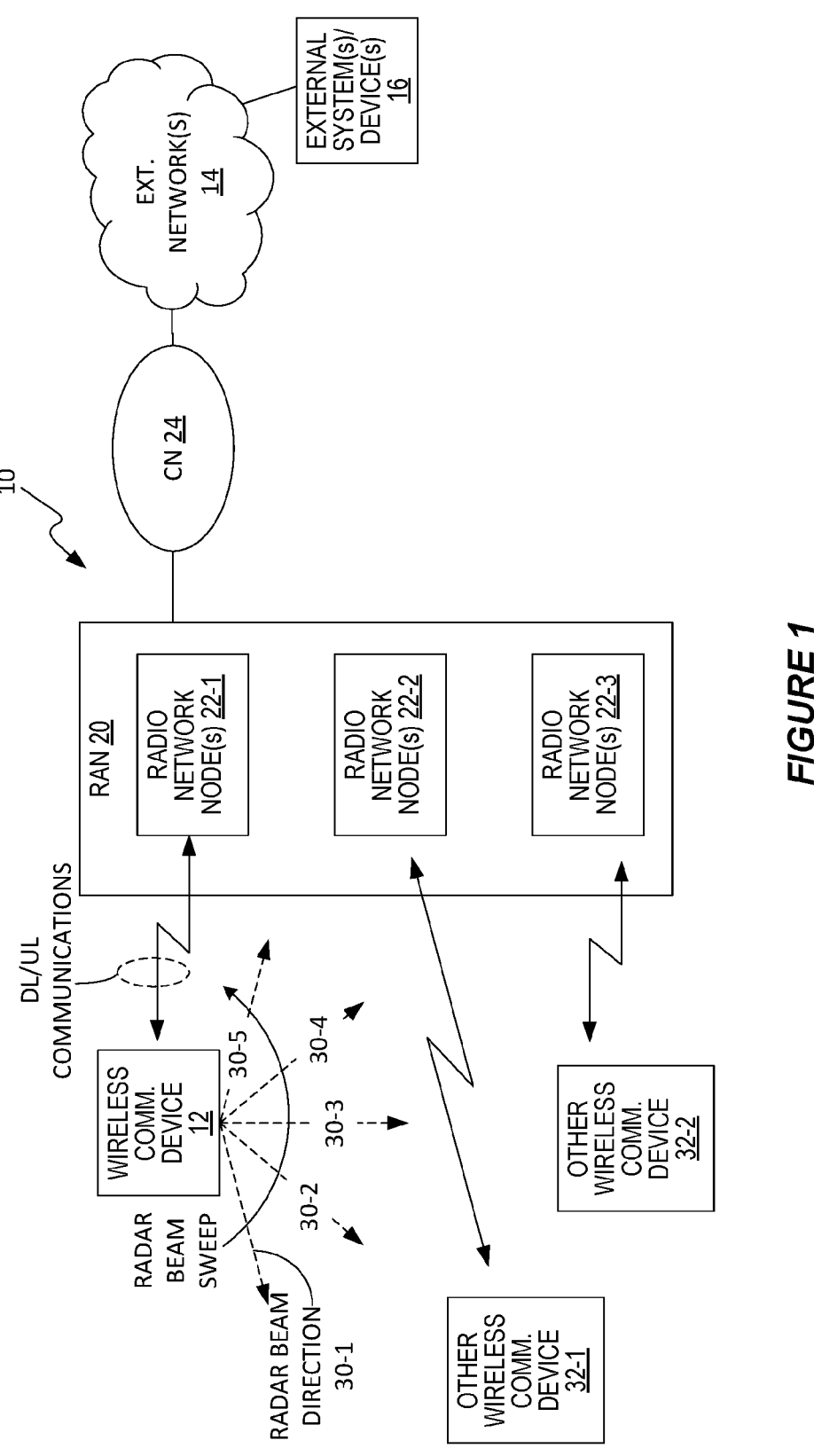
FIG. 1 is a block diagram of one embodiment of a radar-enabled wireless communication device and an associated wireless communication network, which is shown in association with one or more external networks and external devices or systems.

FIG. 1 illustrates an example wireless communication network 10 that operates as an "access network" for a wireless communication device 12, e.g., by communicatively coupling the device 12 to one or more external networks 14 that provide access to one or more external systems or devices 16. Non-limiting examples of communication services provided by the network 10 include voice services and data services and in at least one embodiment the network 10 is configured according to Technical Specifications (TSs) released by the Third Generation Partnership Project (3GPP).

In its example form, the network 10 includes a Radio Access Network (RAN) 20 that includes a number of radio network nodes 22, with nodes 22-1, 22-2, and 22-3 shown by way of example. The terms "radio network node 22" and "radio network nodes 22" are used without suffixing, when suffixing is not needed for clarity. In general, even where the diagrams show suffixed reference numbers, the corresponding discussion uses such suffixing only where it aids clarity.

The RAN 20 may include a greater or lesser number of radio network nodes 22, where the nodes 22 may be understood as access points, base stations, or other equipment that is configured to provide the air interface(s)/radio link(s) used to wirelessly connect with the communication device 12. Further, while individual nodes are not illustrated, a Core Network (CN) 24 of the network 10 includes nodes implementing various network functions needed to authenticate and manage the device 12 and to route data to/from the device 12 with respect to the external network(s) 14 and the external systems/devices 16.

At any given time and within any given coverage area of the RAN 20, the network 10 may support a potentially large number of wireless communication devices, also referred to as User Equipments or UEs. The devices may be of varying types and may use different communication services, e.g., some may be smartphones or other personal computing devices, while others are Machine Type Communication (MTC) or Internet-of-Things (IoT) devices, including stationary or embedded devices. FIG. 1 suggests various ones of these scenarios by illustrating other wireless communications devices 32-1 and 32-2, in addition to illustrating the device 12.

While the devices 32 may be of the same type as the device 12, the different reference numbers provide clarity for discussing operations of the device 12 as a radar-enabled device, with respect to the potential for its radar transmissions to interfere with the reception by the network 10 of Uplink (UL) signals from given other devices 32. For example, a radar transmission by the device 12 that is coincident with an UL transmission by another device 32 may interfere with reception of the UL transmission by the radio network node 22 of the network 10 that is serving the other device 32. In this respect, the device 12 is configured to perform radar transmissions along one or more radar beam directions 30, with example directions 30-1 through 30-5 shown by way of example.

Later diagrams elaborate details of the device 12 but for now consider that the device 12 in one or more embodiments has transmit beamforming capability and has one or more antennas or sets of antenna elements that allow it to perform beamforming in a plurality of directions that are relative to the orientation of the device 12. In an example case, the device 12 uses predefined beam shapes/directions, where such directions may be predefined with respect to the device 12 but, in an absolute sense depend on the current orientation of the device 12.

FIG. 1 suggests that radar transmissions in one or more radar beam directions 30 may interfere with UL reception operations by the network 10, in dependence on a number of factors having complex interrelations. Example factors include the position and/or orientation of the device 12 relative to the various radio network nodes 22 of the network 10, the transmission power(s) used by the device 12 for its radar transmissions, the path loss between the device 12 and respective ones of the nodes 22, the frequencies of the communication signals and radar signals, etc.

In a particular example, the network 10 operates according to a Time Division Duplexing (TDD) arrangement that includes a Downlink (DL) phase wherein the network 10 performs DL operations and an UL phase wherein the network 10 performs UL operations, and methods and apparatuses contemplated herein avoid or reduce radar interference by the device 12 with respect to UL reception during the UL phase of operations. For example, in conjunction with performing a radar beam sweep during an UL phase of operation by the network 10, the device 12 adapts its radar transmissions to avoid transmitting in one or more radar beam direction 30 and/or reduce its radar-signal transmission power in one or more radar beam directions. Such adaptations are not limited, however, to networks using the described UL/DL TDD phases.

Figure 2:
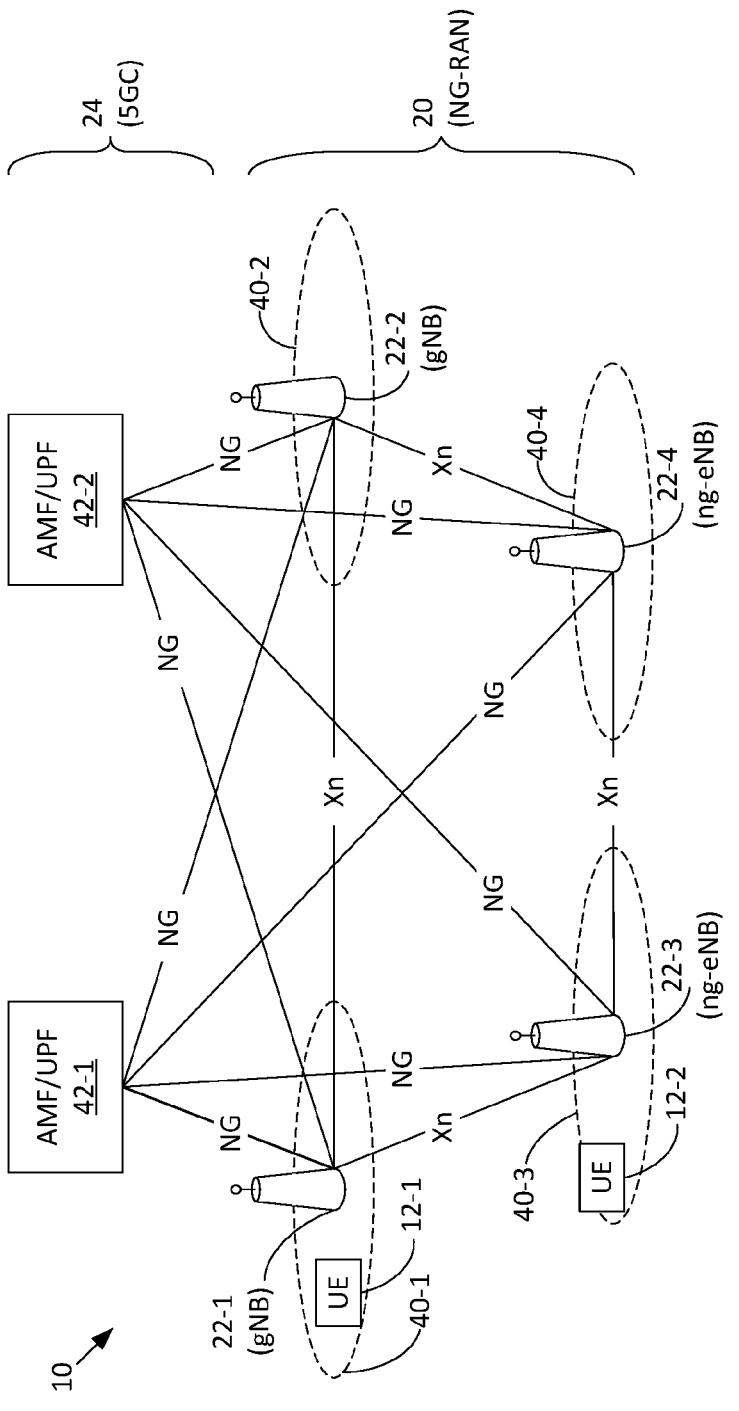
FIG. 2 is a block diagram of another embodiment of a wireless communication network.

FIG. 2 illustrates another example implementation of the network 10, as a Fifth Generation (5G) network having functional elements, interconnections, and operations according to the 5G TS released by the 3GPP. The RAN 20 comprises a Next Generation (NG) RAN wherein one or more radio network nodes provide New Radio (NR) air interfaces.

In particular, in the example depiction, the RAN 20 includes radio network nodes 22 configured as "gNBs" that provide NR air interfaces using the millimeter wave (mmW) frequency range—see the nodes 22-1 and 22-2 configured as gNBs and providing radio coverage in respective coverage areas 40-1 and 40-2. Coverage may be omnidirectional or beamformed or a mix of omnidirectional and beamformed coverage. Additionally, one or more radio network nodes 22 are configured as ng-eNBs, which provide Fourth Generation (4G) Long Term Evolution (LTE) air interfaces but couple to the 5GC—see the nodes 22-3 and 22-4, providing radio service in respective coverage areas 40-3 and 40-4.

The respective coverage areas 40 may overlap at least partly, meaning that NR and LTE air interfaces may be available to device 12 operating in a location having overlapping coverage, and it should be understood that the devices 12-1 and 12-2 depicted in the diagram are shown merely for example. A greater or lesser number of devices may be using the network 10 and may have any given distribution among the respective coverage areas. It should also be understood that radar transmissions from a given device 12 may interfere with the UL transmissions from essentially any other type of device, radar-enabled or not, to the extent that such transmissions are in frequency range relevant to the UL transmissions.

Figure 3:
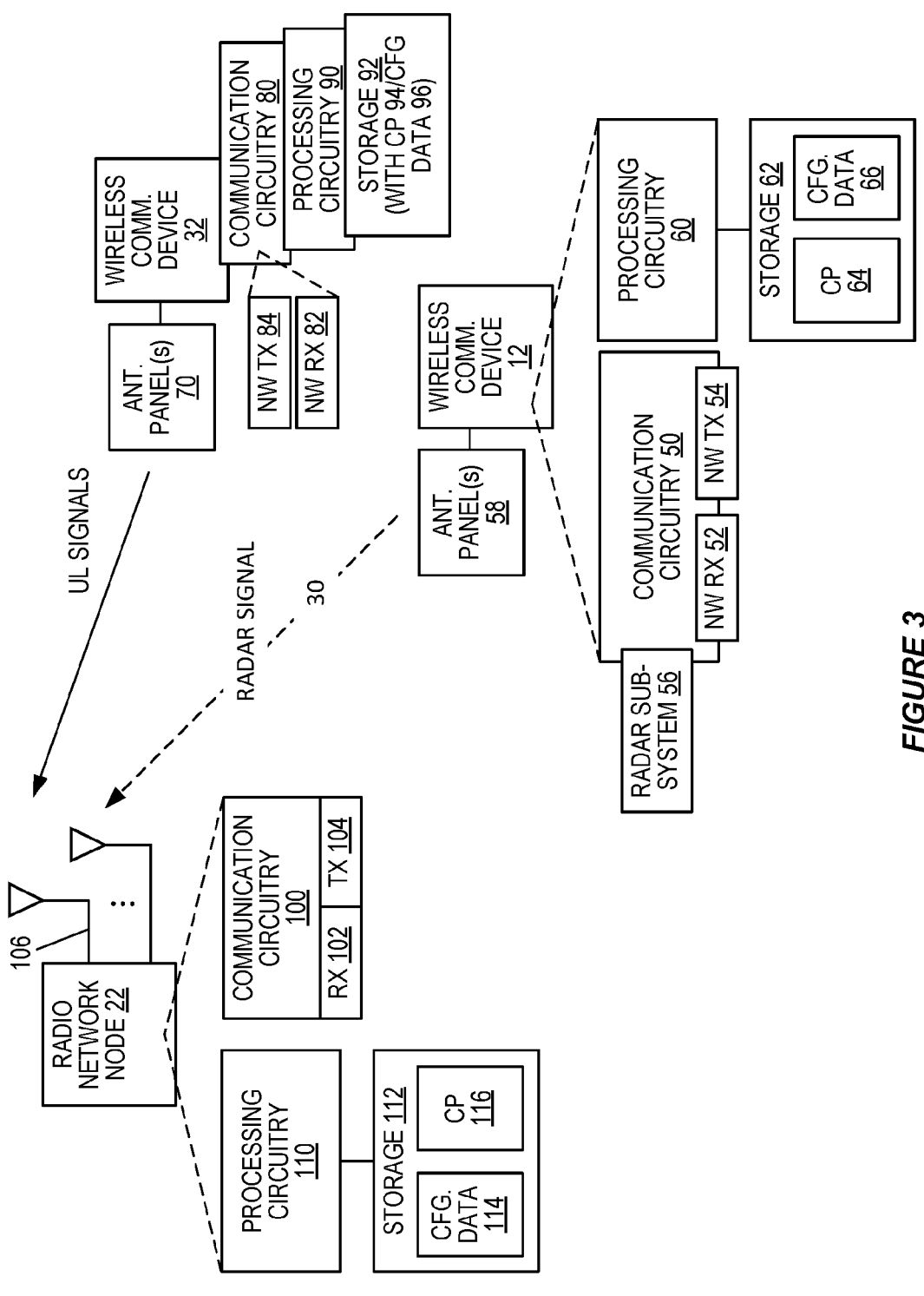
FIG. 3 is a block diagram of example embodiments of a radio network node configured for operation in a wireless communication network, and two wireless communication devices configured for using the network, where at least one of the devices is a radar-enabled device.

FIG. 3 offers an illustrative example, where radar signals transmitted by a device 12 potentially interfere with the reception at a radio network node 22 of the UL signals transmitted by another device 32—i.e., one or more radar beam directions 30 used by the device 12 may be problematic with respect to UL reception operations at the node 22. In this example, the device 12 is configured for communicating with a wireless communication network and performing radar transmissions for surrounding-environment sensing using a same or overlapping mmW frequency range and the device 12 includes communication circuitry 50 that is configured for wireless communications with respect to the wireless communication network, e.g., the network 10, and for radar transmissions.

In an example implementation, the communication circuitry 50 comprises receiver circuitry 52 (Network (NW) RX 52) and transmitter circuitry 54 (NW TX 54) that is configured for receiving DL signals from given radio network nodes 22 of the network 10 and for transmitting UL signals to given nodes 22 of the network 10. The communication circuitry 50 also includes a radar sub-system 56 that is configured for radar probing—i.e., surrounding-environment sensing based on transmitting radar signals and receiving reflected radar signals in return. In an advantageous but non-limiting example, the radar subsystem 56 reuses all or at least a portion of the circuitry (and antennas) used for communicating with the network 10—e.g., reuse of at least a portion of the receiver circuitry 52 and the transmitter circuitry 54, based on performing radar-signal transmissions in a mmW frequency range that is the same as or overlaps with one or more of the mmW frequency ranges used for communicating with the network 10. Of course, the radar subsystem 56 also may include additional circuitry, such as radar reflection reception circuitry used to measure return reflections of the transmitted radar signals and it may interface with and/or reuse portions of processing circuitry 60 included in the device 12.

The processing circuitry 60 comprises fixed circuitry or programmatically-configured circuitry or a mix of both types of circuitry. In non-limiting example implementations, the processing circuitry 60 comprises or includes digital processing circuitry, such as one or more microprocessors, Digital Signal Processors (DSPs), Field Programmable Gate Arrays (FPGAs), Application Specific Integrated Circuits (ASICs), Systems on a Chip (SoC) circuits, etc., along with supporting circuitry, such as clocking, interfacing, and power-management circuitry.

In at least one implementation, the processing circuitry 60 comprises one or more computer circuits that are specially adapted to carry out the device-side operations described in any of the device-related embodiments described herein, based at least in part on the execution of computer program instructions stored in a computer-readable media. To that end, in at least one embodiment, the device 12 includes storage 62 comprising one or more types of computer-readable media that store one or more computer programs (CP) 64 and may store related configuration data (CFG. DATA) 66. The storage 62 comprises one or more types of memory circuits or devices and/or one or more types of storage devices, such as volatile working memory for program execution and non-volatile memory for longer-term program storage. Examples include SRAM, DRAM, FLASH memory, EEPROM, Solid State Disk (SSD), etc.

Such memory provides for non-transitory storage, which does not necessarily mean unchanging or permanent storage but does connote storage of at least some persistence.

The processing circuitry 60 is operatively associated with the communication circuitry 50, e.g., it uses the communication circuitry 50 to exchange data and control signaling with the network 10 and/or it controls operations of the communication circuitry 50. Further, in an example implementation, the processing circuitry 60 is configured to carry out several device-side operations for avoiding or mitigating UL interference caused by radar transmissions from the device 12. In a particular example, the processing circuitry 60 is configured to classify, for a current orientation and position of the device 12, individual radar beam directions 30 among a plurality of radar beam directions 30 as being restricted or unrestricted. Here, any given radar beam direction 30 is classified as being restricted based on known or estimated UL reception interference arising in the network 10 from radar transmissions by the device 12 in the given radar beam direction 30. Further, the processing circuitry 60 is configured to adapt radar transmissions by the device 12 in consideration of the classifications made for the individual radar beam directions 30. The adapting comprises muting or reducing radar-signal transmission power with respect to each restricted radar beam direction 30.

In at least one embodiment, the processing circuitry 60 is configured to repeat the classifying to update the classifications, in response to any one or more of: more than a threshold change in the orientation of the device 12, more than a threshold change in the position of the device 12, more than a threshold change in radar-signal frequency used by the device 12 for radar transmissions, and more than a threshold change in ambient conditions, such as a change in the presence or intensity of rain.

To perform the classifying, the processing circuitry 60 in an example implementation is configured to determine one or more radio network nodes 22 of the network 10 to consider, and for each node 22 being considered and each radar beam direction 30 being considered, estimate an UL received power that would be experienced at the considered node 22 for a radar transmission performed by the device 12 in the considered radar beam direction 30 at a defined transmit power level. The defined transmit power level is, for example, a nominal or default transmit power level used for radar probing and it may be preconfigured in the device 12 or may be dynamically determined as part of ongoing operations—e.g., based on prior or ongoing radar-probing activity.

As for "determining" the one or more nodes 22 to consider, in an example configuration, the processing circuitry 60 is configured to detect the nodes 22 that are currently within range of the device 12, e.g., such as by detecting DL signal transmissions and selecting those nodes 22 for consideration that meet a threshold for received-signal power at the device 12. Additionally, or alternatively, the device 12 may receive assistance information from the network 10, such as neighbor-relation lists that identify neighboring nodes 22, and/or the device 12 may compare its current position to known positions of nodes 22, to identify which nodes 22 are at least nominally within range of the radar transmissions of the device 12.

The processing circuitry 60 in an example implementation is configured to estimate the UL received power that would be experienced at a considered radio network node 22 for a radar transmission performed by the device 12 in a considered beam direction 30, based on receiving a DL reference signal via a DL beam direction that corresponds to the considered radar beam direction 30, estimating a pathloss based on a received-signal power of the DL reference signal, and estimating the UL received power from the pathloss and the defined transmit power level. In one or more implementations, to perform the classifying, the processing circuitry 60 is configured to control the communication circuitry 50 to sweep through defined beam directions 30 for each of two or more antenna panels 58 of the device 12, the two or more antenna panels 58 having different respective orientations.

To perform the classifying, the processing circuitry 60 in at least one embodiment is configured to determine one or more radio network nodes 22 of the network 10 to consider, and for each node 22 being considered, transmit an UL reference signal in one or more UL beam directions that comprise or correspond to a respective one or more of the radar beam directions 30, receive feedback from the considered node 22 that indicates a received power of the UL reference signal for at least one of the one more UL beam directions, estimate, based on the feedback, an UL received power that would be experienced at the considered node 22 for a radar transmission performed by the device 12 in each of the radar beam directions 30, and classify each radar beam direction 30 in dependence on the corresponding estimate of UL received power. Here, estimates of received-signal power may be understood as being equivalent to estimates of received-signal strength.

For transmitting the UL reference signal in the one or more UL beam directions, the processing circuitry 60 in one or more example implementations is configured to perform an UL transmission sweep from each of one or more antenna panels 58 of the device 12. Each UL transmission sweep involves multiple UL beam directions corresponding to respective ones of the radar beam directions 30. The feedback comprises UL received power estimates for the multiple UL beam directions of each UL transmission beam sweep, and the processing circuitry 60 is configured to decide the classification of each radar beam direction 30 in dependence on the UL received power estimate for the corresponding one of the UL beam directions. Note that there may be an overall plurality of radar beam directions 30, with each antenna panel 58 being used to form a subset of them.

In at least one example, for transmitting the UL reference signal in the one or more UL beam directions, the processing circuitry 60 is configured to perform an UL transmission in one UL beam direction from each of one or more selected antenna panels 58 of the device 12. Here, the feedback from the involved node 22 comprises an UL received power estimate for the UL transmission from each of the one or more selected antenna panels 58. For each of the one or more selected antenna panels 58, the processing circuitry 60 is configured to estimate an UL received power for each radar beam direction associated with the selected antenna panel 58 based jointly on the UL received power estimate fed back from a considered node 22 for the selected antenna panel 58 and DL received powers measured by the device 12 during a reception beam sweep performed using the selected antenna panel 58, with respect to DL reference-signal transmissions by the considered node 22.

The reception beam sweep involves multiple reception beam directions corresponding to respective ones of the radar beam directions 30 that are associated with the selected antenna panel 58. In other words, by knowing the UL received power estimate for one UL beam from an antenna panel 58 in combination with measuring DL received powers corresponding to a reception-beam sweep performed using the antenna panel 58, the processing circuitry 60 has a basis for estimating the received-signal power at the node 22, for radar transmissions performed in the radar beam directions 30 that are associated with the antenna panel 58.

In at least one embodiment, to perform the classifying and with respect to any radar beam direction 30 classified as restricted, the processing circuitry 60 is configured to determine whether the radar beam direction 30 should be considered as "conditionally" restricted, in dependence on a degree to which radar transmissions in the radar beam direction 30 are estimated as interfering with UL reception in the network 10. In such embodiments, the processing circuitry 60 is configured to perform radar transmissions in radar beam directions 30 that are conditionally restricted at lower transmission powers than are used by the device 12 for radar transmissions in radar beam directions 30 that are unrestricted. Such operations may be understood as qualifying the "extent" to which a radar beam direction 30 is restricted. Conditional restriction means that the processing circuitry 60 may still perform radar transmissions in the radar beam direction 30, but it lowers the transmit power as compared to the transmission power it would use absent the restriction. Conversely, for a radar beam direction 30 classified as unconditionally restricted, the processing circuitry 60 may mute its transmission power in the radar beam direction 30—a zero power transmission—or it may simply "skip" the radar beam direction 30, e.g., by excluding it from any radar beam sweep that is based on a current set of classifications for the radar beam directions 30.

In further examples of nuance or qualification regarding the classifying operations, the processing circuitry 60 in one or more embodiments is configured to perform the classifying in dependence on at least one of a criticality of UL communications vulnerable to radar interference by the device 12, one or more Quality-of-Service (QoS) requirements of the UL communications vulnerable to radar interference by the device 12, an estimated likelihood of UL communications occurring during a next performance of radar transmissions by the device 12, and a position of the device 12 relative to one or more nodes 22 of the network 10. The processing circuitry 60 obtains such information, for example, based on receiving assistance information from the network 10, based on stored configuration data, and/or based on Device-to-Device (D2D) communications with proximate other wireless communication devices 32.

As noted, the other wireless communication devices 32 may or may not be radar-enabled devices and may or may not be of the same type as the example device 12. However, FIG. 3 illustrates that a neighboring other device 32 may comprise communication circuitry 80, with network receiver circuitry 82 and network transmitter circuitry 84, processing circuitry 90, storage 92, which may store one or more computer programs 94 and configuration data 96. The device 32 also may include one or more antenna panels 70 for communicating with a wireless communication network 10.

As for the one or more antenna panels 58 of the device 12, in at least one embodiment of the device 12, it includes two or more antenna panels 58 having different relative orientations and correspondingly different directionalities with respect to the current orientation of device 12. Each antenna panel 58 supports one or more of the radar beam directions 30, and the processing circuitry 60 is configured to determine which antenna panels 58 are directionally relevant to particular nodes 22 of the network 10, based on the current orientation of the device 12.

Further, in at least one embodiment, to perform the classifying, the processing circuitry 60 of the example device 12 is configured to perform a beam identification procedure with respect to each radio network node 22 of the network 10 that is being considered. The beam identification procedure comprises transmitting UL reference signals in one or more UL beam directions from each of one or more antenna panels 58 of the device 12, for each considered node 22, receiving feedback from the considered radio network node 22 that identifies the UL beam direction corresponding to a strongest received one of the transmitted UL reference signals, and classifying the radar beam direction or directions corresponding to the identified UL beam direction as being restricted. With respect to performing the beam identification procedure, the processing circuitry 60 in at least one such embodiment is configured to perform two or more iterations of the beam identification procedure with respect to at least one of the radio network nodes 22 being considered. Each iteration excludes the UL beam directions identified in all prior iterations.

FIG. 4 illustrates another embodiment, comprising a method 400 of operation performed by a wireless communication device that communicates with a wireless communication network and performs radar transmissions for surrounding-environment sensing. In an example scenario, the device and network in question are the device 12 and the network 10 described earlier. Using that example scenario, the method 400 includes the device 12 classifying (Block 402), for a current orientation and position of the device 12, individual radar beam directions 30 among a plurality of radar beam directions 30 as being restricted or unrestricted. Any given radar beam direction 30 is classified as being restricted based on known or estimated UL reception interference arising in the network 10 from radar transmissions by the device 12 in the given radar beam direction 30. Further, the method 400 includes adapting (Block 404) radar transmissions by the device 12 in consideration of the classifications made for the individual radar beam directions 30. Adapting comprises, for example, muting or reducing radar-signal transmission power with respect to each restricted radar beam direction 30.

"Muting" means a zero-power transmission and the term "muting" also encompasses simply skipping radar transmissions in restricted ones of the radar beam directions 30. For example, when performing a radar beam sweep, the device 12 may divide the sweep time into respective beam dwell times corresponding to the respective radar beam directions 30 encompassed by the sweep. A restricted beam direction 30 can be included or omitted from the sweep. For example, the device 12 performs no radar transmission during the dwell time associated with a restricted radar beam direction 30. In such cases, however, the device 12 in at least one embodiment simply excludes the restricted radar beam direction(s) 30 from the sweep. On the other hand, especially in cases where one or more radar beam directions 30 are conditionally restricted, those directions are included in the sweep(s) but the device 12 either does not perform radar transmissions in those directions or performs such transmissions at reduced powers.

At least one implementation of the method 400 includes repeating the classifying (Block 402) to update the classifications, in response to any one or more of: more than a threshold change in the orientation of the device 12, more than a threshold change in the position of the device 12, more than a threshold change in radar-signal frequency used by the device 12 for radar transmissions, and more than a threshold change in ambient conditions.

Classifying (Block 402) comprises, for example, determining one or more radio network nodes 22 of the network 10 to consider, and for each node 22 being considered and each radar beam direction 30 being considered, estimating an UL received power that would be experienced at the considered radio network node 22 for a radar transmission performed by the device 12 in the considered radar beam direction 30 at a defined transmit power level. As a particular example, the device 12 estimates the UL received power that would be experienced at the considered node 22 for a radar transmission performed by the device 12 in the considered beam direction 30 by receiving a DL reference signal via a DL beam direction that corresponds to the considered radar beam direction 30, estimating a pathloss based on a received-signal power of the DL reference signal, and estimating the UL received power from the pathloss and the defined transmit power level. Additionally, or alternatively, the device 12 estimates the UL received power that would be experienced at the considered node 22 for a radar transmission performed by the device 12 in the considered radar beam direction 30 based on the DL received power experienced at the device 12 for receiving a DL reference signal from the node 22 using a DL reception beam that corresponds to the radar beam direction—e.g., the DL reception beam shape/orientation matches the radar beam shape/orientation, or at least directionally aligns with it.

In at least some implementations of the method 400, classifying (Block 402) includes the device 12 sweeping through defined beam directions 30 for each of two or more antenna panels 58 of the device 12, where the two or more antenna panels 58 have different respective orientations.

The step of classifying (Block 402) may also comprise the device 12 determining one or more radio network nodes 22 of the network 10 to consider, and for each node 22 being considered, transmitting an UL reference signal in one or more UL beam directions that comprise or correspond to a respective one or more of the radar beam directions 30, receiving feedback from the considered node 22 that indicates a received power of the UL reference signal for at least one of the one more UL beam directions, estimating, based on the feedback, an UL received power that would be experienced at the considered node 22 for a radar transmission performed by the device 12 in each of the radar beam directions 30, and classifying each radar beam direction 30 in dependence on the corresponding estimate of UL received power.

Transmitting the UL reference signal in the one or more UL beam directions comprises, for example, the device 12 performing an UL transmission sweep from each of one or more antenna panels 58 of the device 12, each UL transmission sweep involving multiple UL beam directions corresponding to respective ones of the radar beam directions 30. The feedback comprises UL received power estimates for the multiple UL beam directions of each UL transmission beam sweep, and the method 400 includes the device 12 deciding the classification of each radar beam direction 30 in dependence on the UL received power estimate for the corresponding one of the UL beam directions.

As another example, transmitting the UL reference signal in the one or more UL beam directions comprises the device 12 performing an UL transmission in one UL beam direction from each of one or more selected antenna panels 58, and the feedback comprises an UL received power estimate for the UL transmission from each of the one or more selected antenna panels 58. Correspondingly, the method 400 includes, for each of the one or more selected antenna panels 58, the device 12 estimating an UL received power for each radar beam direction associated with the selected antenna panel 58 based jointly on the UL received power estimate fed back from the considered node 22 for the selected antenna panel 58 and DL received powers measured by the device 12 during a reception beam sweep using the selected antenna panel 58, with respect to DL reference-signal transmissions by the considered node 22. Here, the reception beam sweep involves multiple reception beam directions corresponding to respective ones of the radar beam directions 30 that are associated with the selected antenna panel 58.

As another example, the classifying (Block 402) includes, with respect to any radar beam direction 30 classified as restricted, determining whether the radar beam direction 30 should be considered as conditionally restricted, in dependence on a degree to which radar transmissions in the radar beam direction 30 are estimated as interfering with UL reception in the network 10. Here, the method 400 may include performing radar transmissions in radar beam directions 30 that are conditionally restricted at lower transmission powers than are used by the device 12 for radar transmissions in radar beam directions 30 that are unrestricted. That is, the device 12 may skip radar transmissions in radar beam directions that are unconditionally restricted and may reduce its radar-signal transmission power in radar beam directions 30 that are conditionally restricted.

The classifying (Block 402) may also depend on at least one of a criticality of UL communications vulnerable to radar interference by the device 12, one or more QoS requirements of the UL communications vulnerable to radar interference by the device 12, an estimated likelihood of UL communications occurring during a next performance of radar transmissions by the device 12, and a position of the device 12 relative to one or more nodes 22 of the network 10.

In any one or more embodiments of the method 400, the classifying (Block 402) may include performing a beam identification procedure with respect to each radio network node 22 of the network 10 that is being considered by the device 12. The beam identification procedure includes transmitting UL reference signals in one or more UL beam directions from each of one or more antenna panels 58 of the device 12 and, for each considered node 22, receiving feedback from the considered node 22. The feedback identifies the UL beam direction corresponding to a strongest received one of the transmitted UL reference signals, and, correspondingly, the method 400 includes the device 12 classifying the radar beam direction 30 or directions 30 corresponding to the identified UL beam direction as being restricted. The method 400 may include performing two or more iterations of the beam identification procedure with respect to at least one of the radio network nodes 22 being considered, and wherein each iteration excludes the UL beam directions identified in all prior iterations. That is, the radar beam direction 30 associated with the strongest one of the received UL reference signals in each iteration gets classified as "restricted" and eliminated from consideration in the next iteration.

FIG. 5 illustrates another embodiment of a wireless communication device 12 comprising a set of processing units or modules 120. The modules comprise, for example, functional arrangements of processing circuitry and may be implemented, for example, via the execution of computer program instructions.

The illustrated set of modules 120 includes a classifying module 122 that is configured to classify, for a current orientation and position of the device 12, individual radar beam directions 30 among a plurality of radar beam directions 30 as being restricted or unrestricted. Any given radar beam direction 30 is classified as being restricted based on known or estimated UL reception interference arising in the network 10 from radar transmissions by the device 12 in the given radar beam direction 30. Further included is an adapting module 124 that is configured to adapt radar transmissions by the device 12 in consideration of the classifications made for the individual radar beam directions 30. The adapting comprises, for example, muting or reducing radar-signal transmission power with respect to each restricted radar beam direction 30.

Turning back to FIG. 3 for a depiction of an example arrangement for a radio network node 22, the illustrated node 22 includes communication circuitry 100, including receiver (RX) circuitry 102 and transmitter (TX) circuitry 104. One or more antennas 106 (or arrays of antenna elements) are associated with the communication circuitry 100, for transmitting DL signals to given wireless communication devices and receiving UL signals from such devices.

Further, the node 22 includes processing circuitry 110. The processing circuitry 110 comprises fixed circuitry or programmatically-configured circuitry or a mix of both types of circuitry. In non-limiting example implementations, the processing circuitry 110 comprises or includes digital processing circuitry, such as one or more microprocessors, Digital Signal Processors (DSPs), Field Programmable Gate Arrays (FPGAs), Application Specific Integrated Circuits (ASICs), Systems on a Chip (SoC) circuits, etc., along with supporting circuitry, such as clocking, interfacing, and power-management circuitry.

In at least one implementation, the processing circuitry 110 comprises one or more computer circuits that are specially adapted to carry out the network-node-side operations described in any of the node-related embodiments described herein, based at least in part on the execution of computer program instructions stored in a computer-readable media. To that end, in at least one embodiment, the node 22 includes storage 112 comprising one or more types of computer-readable media that store one or more computer programs 116 and may store related configuration data 114. The storage 112 comprises one or more types of memory circuits or devices and/or one or more types of storage devices, such as volatile working memory for program execution and non-volatile memory for longer-term program storage. Examples include SRAM, DRAM, FLASH memory, EEPROM, Solid State Disk (SSD), etc. Such memory provides for non-transitory storage, which does not necessarily mean unchanging or permanent storage but does connote storage of at least some persistence.

The processing circuitry 110 is operatively associated with the communication circuitry 100, e.g., it uses the communication circuitry 100 to send and receive wireless signaling to/from wireless devices. In one or more examples, the processing circuitry 110 is configured to receive UL reference-signal transmissions corresponding to respective UL transmit beam directions at a wireless communication device 12, estimate UL received powers for the UL reference-signal transmissions, and send feedback for the device 12. The feedback indicates the UL received powers corresponding to one or more of the UL transmit beam directions.

The processing circuitry 110 in at least one embodiment is configured to perform the receive, estimate, and send operations as a supporting procedure for a radar beam classification procedure performed at the device 12. For example, the processing circuitry 110 performs the supporting procedure responsive to the node 22 receiving initiation signaling from the device 12. Correspondingly, the device

12 uses the feedback provided by the node 22 to classify radar beam directions 30 as restricted or unrestricted with respect to interfering with UL reception operations at the node 22.

To receive the UL reference-signal transmissions corresponding to respective UL transmit beam directions at the device 12, the processing circuitry 110 in one or more embodiments is configured to receive one or more UL reference-signal transmissions from each of one or more antenna panels 58 of the device 12. Each UL transmit beam direction corresponds with a respective radar beam direction 30 among a plurality of radar beam directions 30 associated with radar transmissions used by the device 12 for surrounding-environment sensing. The UL reference-signal transmissions use a mmW frequency range that is the same as or overlaps with a frequency range used by the device 12 for the radar transmissions.

To receive the UL reference-signal transmissions corresponding to respective UL transmit beam directions at the device 12, the processing circuitry 110 may be configured to perform a receive beam sweep using multiple UL receive beam directions, record UL received powers for best pairings of the multiple UL transmit beam directions and the multiple UL receive beam directions, and send, as the feedback, the recorded UL received powers to the device 12. As another example, to receive the UL reference-signal transmissions corresponding to respective UL transmit beam directions at the device 12, the processing circuitry 110 is configured to perform a receive beam sweep using multiple UL receive beam directions, record UL received powers for best pairings of the multiple UL transmit beam directions and the multiple UL receive beam directions, and send, as the feedback, the recorded UL received power of a best pairing between the UL transmit beam directions and the UL receive beam directions. That is, the feedback may indicate the UL received powers for each of the UL transmit beam directions and/or the best UL transmit and UL receive beam pairings for each of the UL transmit beam directions, or it may indicate the UL received power for the UL transmit beam direction corresponding to a "best" (strongest) one of the received UL reference-signal transmissions.

FIG. 6 illustrates a method 600 performed by a radio network node, such as a base station or other access node, of a wireless communication network, e.g., a node 22 of the network 10 as introduced in FIG. 1. Using that example context, the method 600 includes the node 22 receiving (Block 602) UL reference-signal transmissions corresponding to respective UL transmit beam directions at device 12, estimating (Block 604) UL received powers for the UL reference-signal transmissions, and sending (Block 606) feedback for the device 12. The feedback indicates the UL received powers corresponding to one or more of the UL transmit beam directions—e.g., each direction or a "best" direction associated with the strongest signal reception at the node 22.

Operations at the node 22 may include performing the method 600 as a supporting procedure (Block 608) for a radar beam classification procedure performed at the device 12. For example, the node 22 performs the supporting procedure responsive to the node 22 receiving initiation signaling from the device 12 (YES from Block 610). The device 12 uses the feedback provided by the node 22 to classify radar beam directions 30 as restricted or unrestricted with respect to interfering with UL reception operations at the node 22.

Receiving (Block 602) the UL reference-signal transmissions corresponding to respective UL transmit beam directions at the device 12 comprises, for example, receiving one or more UL reference-signal transmissions from each of one or more antenna panels 58 of the device 12, where each UL transmit beam direction corresponds with a respective radar beam direction 30 among a plurality of radar beam directions 30 associated with radar transmissions used by the wireless communication device 12 for surrounding-environment sensing. Here, the UL reference-signal transmissions use a mmW frequency range that is the same as or overlaps with a frequency range used by the wireless communication device 12 for the radar transmissions. More generally, there is an overlap or adjacency in the frequency spectrum between the frequency range used by the device 12 for radar transmissions and the frequency/frequencies used in the network 10 for UL transmissions.

Receiving (Block 602) the UL reference-signal transmissions corresponding to respective UL transmit beam directions at the device 12 may include the node 22 performing a receive beam sweep using multiple UL receive beam directions, recording UL received powers for best pairings of the multiple UL transmit beam directions and the multiple UL receive beam directions, and sending, as the feedback, the recorded UL received powers to the device 12. Alternatively, the feedback indicates the recorded UL received power of a best pairing between the UL transmit beam directions and the UL receive beam directions.

FIG. 7 illustrates another embodiment of a radio network node, e.g., another example implementation for the node 22 introduced in FIG. 1. Here, the node 22 comprises a collection of processing units or modules 130, which may be functional processing units implemented via underlying processing circuitry. The modules 130 may, for example, be implemented as virtual processing elements in a virtualization environment, such as may be hosted by a computer server in a data center that may be remote from the physical-layer circuitry used to anchor the radio air interface.

The depicted modules 130 include a receiving module 132 that is configured to receive UL reference-signal transmissions corresponding to respective UL transmit beam directions at a wireless communication device 12, an estimating module 134 that is configured to estimate UL received powers for the UL reference-signal transmissions, and a sending module 136 that is configured to send feedback for the device 12. The feedback indicates the UL received powers corresponding to one or more of the UL transmit beam directions. The modules 130 may be configured to perform the receive, estimate, and send operations as a supporting procedure for a radar beam classification procedure performed at the device 12. For example, they perform the supporting procedure responsive to the node 22 receiving initiation signaling from the device 12. Correspondingly, the device 12 uses the feedback provided by the supporting procedure to classify radar beam directions 30 as restricted or unrestricted with respect to interfering with UL reception operations at the node 22.

With the above example details in mind, a 5G network may operate in a TDD arrangement involving alternating UL and DL phases, and a goal of coexistence between radar and the 5G network may be considered with respect to the UL phases of 5G-network operation. A contemplated approach herein uses 5G beam management to select a subset of transmit beams for radar transmissions by a wireless communication device—a UE—to avoid radar interference with UL reception at nearby base stations of the 5G network. Advantageous aspects of one or more of the techniques disclosed herein include beam training approaches to select the radar beam directions in order to avoid or reduce uplink interference at the vulnerable network base stations (BSs), the use of approaches that build on 3GPP standards or otherwise integrate well with such standards, and approaches that are autonomous at the UE.

In 5G NR, UEs and BSs use the mmW frequencies (Frequency Range 2 or "FR2") in TDD mode for communication. Although using this frequency range opens a wide spectrum, it is highly susceptible to blockage and attenuation. Hence, suitable beams need to be found at the UE and its serving BS, for carrying out 5G communication.

At least some UEs may also be configured to use the mmW frequencies to send radar signals. These radar signals, as noted at various points in this disclosure, may cause substantial interference in UL reception operations at one or more of the BSs, depending on a number of factors, including the proximity of the UE to one or more BSs in the network. UL interference arises when a radar-enabled UE sends out radar signals while other UEs are transmitting uplink signals, e.g., uplink control/data or SRS signals, towards a BS that is within reception range of the radar signals.

The radar-enabled UE may use different signals such as Sounding Reference Signals (SRS) as radar pulses used by the UE to sense its surrounding environment. If the radar-enabled UE uses an SRS that is the same as an SRS used by another UE for UL sounding, the radar-related SRS transmission may interfere with the UL-related SRS transmission from the other UEs, in terms of the involved BS receiving the UL-related SRS transmission. Techniques disclosed herein mitigate the UL interference between the radar-enabled UE and the other surrounding UEs at the BS.

For example, radar beams of the radar-enabled UE that cause less than threshold interference are denoted as "unrestricted beams" and those beams that cause higher than threshold interference are denoted as "restricted beams". Here, the different radar beams will be understood as involving different radar beam directions. To avoid unnecessary beam training/retraining between the radar-enabled UE and the BS, Internal Measurement Unit (IMU) information of the radar-enabled UE may be used to switch to equivalent beams. For example, from the most current beam training, the UE classified certain radar beam as "unrestricted". Upon a rotation of the UE, the UE may use the IMU information to determine which of its radar beams now correspond to the "unrestricted" directions. Thus, in at least some instances, the IMU information allows the UE to reduce or eliminate beam retraining in conjunction with a change in the orientation of the UE. Hereafter, the radar-enabled UE is simply referred to as a UE, for convenience.

The UE can use SRS beam training power to estimate the transmit power that causes a beam to become restricted in terms of its use for radar transmissions. The UE can use the estimated interference power to tune the power of radar signal in different beams. Tuning the power may be made to depend on communication criticality, where the restriction threshold may depend on the communication criticality. Higher thresholds can be adapted when communication criticality is lower for the communications that may be interfered with by the radar transmissions of the UE. Alternatively, the UE may forbid radar transmissions in a given radar beam direction if the communication criticality is above a certain threshold.

Tuning the radar transmit power may also depend on communication quality, where the threshold can adapt in dependence on the communication signal quality associated with the communications that are subject to radar interference. Example quality parameters include QoS, Bit Error Rate (BER), or latency. The parameters may be calculated using the link budget, modulation, coding, etc. Another consideration for tuning radar transmissions is communication likelihood, where the UE can adapt the threshold based on the probability of its radar transmissions occurring concurrent with UL communications. Tuning may also depend on the location of the UE, e.g., the distance of the UE to a BS along a certain beam direction. For example, if the UE is at the edge of a cell associated with a given base station, it can transmit its radar signals with higher power, at least in terms of the interference situation at the given base station. The presence of neighboring base stations may require further evaluation by the UE.

The UE may reevaluate its radar beam directions when the frequency varies, because different frequencies have different atmospheric attenuations. If the frequency change is within FR2 range, 24.25-52.6 GHz, it results in negligible power fluctuation, i.e., less than 1 dB, which is negligible when considering the UE distance to the BS. On the other hand, higher frequencies, e.g., THz frequency range, could cause considerable power fluctuation. For instance, moving from 90 GHz to 200 GHz can significantly vary the attenuation, which changes the number of restricted and unrestricted beams of the radar-enabled UE. And, in at least some embodiments, the UE considers precipitation—e.g., whether or to what extent it is raining or whether or to what extent the rain has changed.

A UE as contemplated in this disclosure can perform beam training to find the "unrestricted" and "restricted" radar beams to avoid radar interference during UL phases of a wireless communication network. The UE can train all its antenna panels and the corresponding beams, although such comprehensive training may consume significant power and may cause undue interference. The UE can utilize both uplink and downlink beam training approaches to efficiently estimate the power of each beam at a BS that is being evaluated in terms of its vulnerability to radar-caused interference in its UL reception operations.

In an example scheme, the UE sweeps through wider beams when listening to SS/PBCH (Synchronization Signal/ Physical Broadcast Channel) transmissions by the BS in an FR2 frequency and selects the antenna panels for which the UE measures received signal strength above a certain threshold. UE can indicate the corresponding SS/PBCH blocks to the BS and then sweep through the selected Rx panels and RX beams while the BS transmits Channel State Information Reference Signals (CSI-RS) through selected Tx beams. Here, a "Tx beam" is beamform transmissions from a transmitting entity, and an "Rx beam" is a beamformed reception at a receiving entity.

A proposed beam training procedure contemplated herein divides into the following parts based on: certain knowledge at the UE regarding the BS, whether the UE supports "beam correspondence", and whether the BS is operative to feed back the received powers of all Tx beams transmitted by the UE in a beam-training sweep.

Beam correspondence at the UE refers to correspondence between UL and DL beams. If the UE supports beam correspondence and knows, for example, the transmit power used by the BS for transmitting the DL reference signals used by the UE for beam training, the UE can use the reciprocity principle to find unrestricted and restricted beams. A UE design satisfies directional reciprocity requirements if there are sets of Rx and Tx beamforming weights for the UE that result in sufficiently similar Rx and Tx beam directivity patterns, respectively.

A "reciprocal" UE therefore can receive DL signals from the BS, e.g., CSI-RS, using Rx beamforming weights that correspond to the beamforming configurations used by the UE when it performs an SRS sweep. Thus, the UE may use its measurements of received power for the DL CSI-RS transmissions by the BS and its knowledge of the value of the transit power used at the BS to estimate the pathloss to the BS. Then, the UE uses the pathloss estimate along with Tx-Rx beam symmetry (Rx/Tx reciprocity) to estimate the received uplink power that would be experienced at the BS for respective Tx beam directions. If the estimated power exceeds a defined threshold associated with undue interference, the UE may mark the Tx beam direction as restricted. And, as noted, the threshold may be adapted in dependence on a number of factors and/or the UE may adapt how or to what extent it reduces radar-signal power for the restricted beam directions.

If the UE supports beam correspondence but lacks knowledge of the transmit power(s) used at the BS, the UE can use the UL power level of the best UL beam received at the BS during a Tx beam sweep performed by the UE. Here, "best" denotes strongest and the BS may signal such information as feedback to the UE. The UE may then use that feedback along with the received-signal power of the DL CSI-RS received from the BS on the reciprocal RX beam to estimate the received-signal power level that would be experienced at the BS for radar transmissions via one or more other ones of the Tx beams.

In a case where the BS does not have Tx power information for the BS and does not support beam reciprocity, the UE can perform uplink beam training by transmitting SRS signals through selected beams of selected antenna panels, for classification of its Tx beam directions as being unrestricted and restricted with respect to radar transmissions.

Consider a case where the UE performs a Tx beam sweep and the BS feeds back the received power of all Tx beams of the UE. In this case, the UE in one or more embodiments uses a "best beam elimination" approach as follows: (1) the UE sends SRS signals through the selected beams of the selected antenna panels, which may be selected based on measured signal strengths of DL CSI-RS received from the BS during an Rx beam sweep, and (2) receives a best UL Tx beam index and power/quality indication from the BS. Then, the UE considers the indicated best beam as a restricted beam. The UE can repeat the SRS transmission at the next SRS sweep occasion without transmitting via the previous best UL beam to receive a best beam index and quality indication for the remaining beams, i.e., the next best beam. If the next best beam quality is above a threshold, the UE considers it as "restricted beam". If the index feedback from the BS indicates that the best beam results in a received signal strength at the BS which is below the threshold, the UE stops beam sweeping and considers the remaining beams, for which the BS has not yet sent any feedback on, as "unrestricted" beams.

Certain beam training schemes contemplated herein may involve uncertainty regarding the classification of restricted and unrestricted beams. To handle this, the UE can use two thresholds instead of one to classify beam restriction. If the estimated interference value towards the BS is above the higher threshold, denoted by $T_{high}$, or below the lower threshold, denoted by $T_{low}$, with high confidence, the UE classifies the corresponding beam directions as restricted and unrestricted, respectively. If the estimated interference value is between $T_{high}$ and $T_{low}$, the beam is classified as conditionally restricted. To use a conditionally restricted beam, the radar transmit power level used for radar-signal transmissions in that direction must be reduced with a safety margin.

For a higher confidence, the UE can perform beam training with respect to the subset of radar beam directions 30 that have been classified as conditional beam directions, to resolve their classifications into restricted and unrestricted ones—i.e., eliminate the "conditional" nature of the restrictions. The threshold values used for such classifications are trained, for example, using estimated and actual interference values determined from the beam training.

In at least one embodiment, the UE has knowledge of its own position, the position of a BS under consideration, and whether there is Line-of-Sight (LoS) from the UE to the BS, and the UE is configured to use IMU information to identify the restricted beams—i.e., to perform the classification of individual radar beam directions 30 as being restricted or unrestricted. In addition, the UE can use such information to perform more efficient beam training on specific antenna panels 58 instead of training over all antenna panels 58 to identify the restricted beams.

In another embodiment, the UE is configured to use different antenna panels 58 to synthesize a beam with null toward the BS with respect to radar sensing performed by the UE.

FIG. 8 illustrates a method 800 performed by a UE with respect to a BS being evaluated for vulnerability to UL interference associated with radar transmissions by the UE. The method 800 represents beam training based on "best-beam" identifications. The method 800 may be performed for a "registered" set of parameters representing a current state represented by IMU information regarding position and orientation of the UE, the frequency/frequencies used for UL signals, and ambient conditions, such as the presence of rain or current rain intensity. That is, the training procedure may be performed over two or more iterations, so long as the current state holds, at least within defined thresholds.

The UE determines (Block 802) a "sweeping set" of UL beam directions comprising selected UL beam directions and corresponding selected antenna panels of the UE. The selections may be based on IMU information, prior beam training, etc. The UE transmits (Block 804) an UL reference signal for the subject BS via the sweeping set of UL beam directions, and receives (Block 806) return information from the BS that indicates the beam index and received-signal strength of the "best" UL beam direction from the sweeping set. Here, "best" is the UL beam direction associated with the highest received-signal strength measured at the BS for the UL reference signal.

If the signal strength reported by the BS for the best beam is above the threshold that defines, for example, an acceptable UL interference limit (YES from Block 808), the UE classifies (Beam 810) the best beam as restricted and removes (Block 812) the best beam from the sweeping set and repeats the sweeping-set transmission and resulting best-beam evaluation (Blocks 804, 806, and 808) for the now-reduced sweeping set. If the received signal strength for the best beam of the reduced sweeping set is again above the threshold, it is classified as restricted and the process repeats. Once the UE performs an iteration where the received signal strength for the best beam of the current iteration is below the threshold (NO from Block 808), the UE ends the iterative process and classifies (Block 814) the remaining beams in the sweeping set as unrestricted. The UE may also use an iteration counter to limit the number of best-beam iterations it allows and/or it may iteratively adjust the threshold used in the Block-808 evaluation to limit the number of iterations.

Figure 9B:
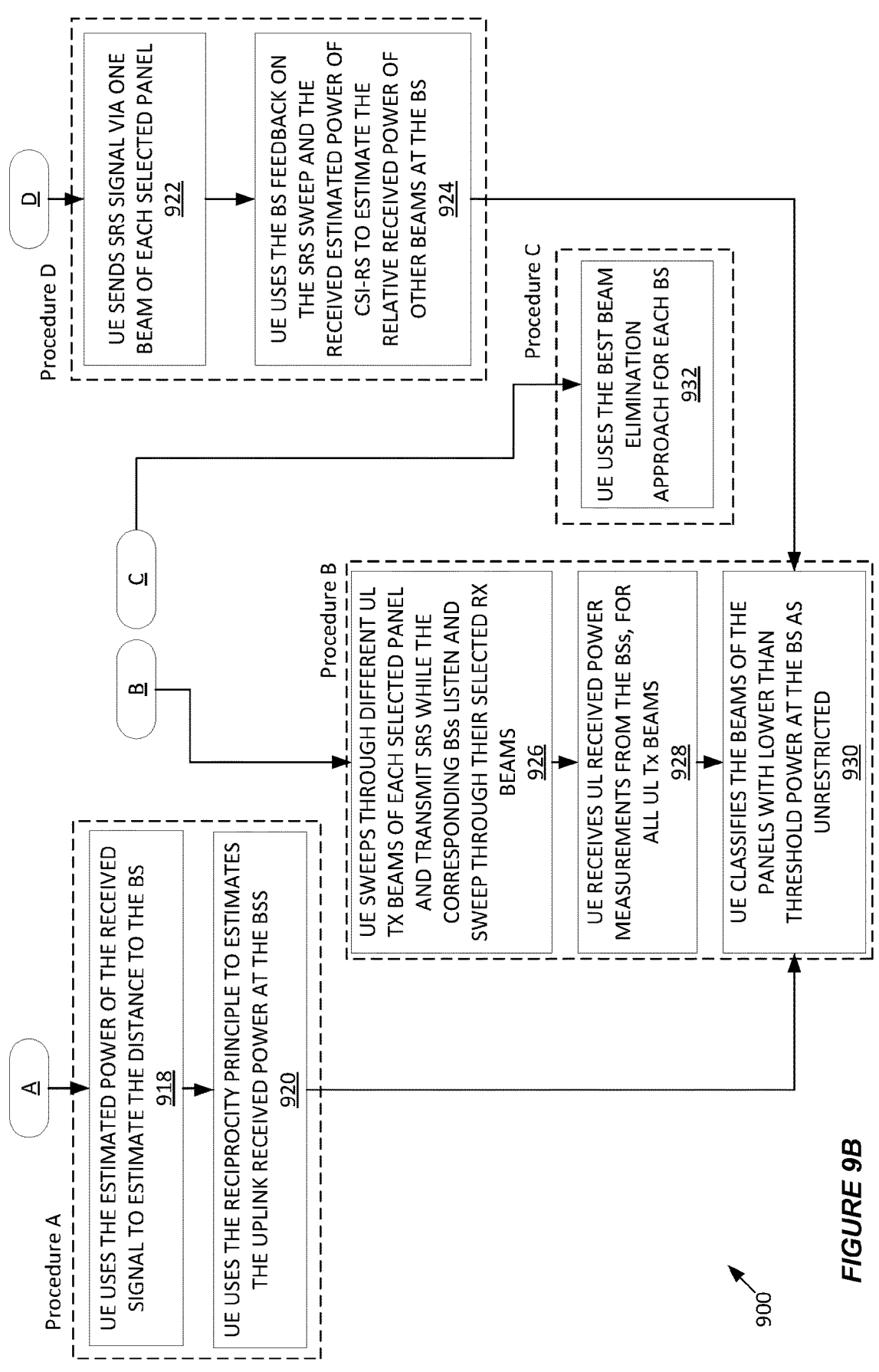

FIGS. 9A and 9B illustrate another embodiment of a beam training used by a UE to classify respective radar beam directions as restricted or unrestricted. Again, the classifications may apply to the current state of prevailing conditions at or around the UE, regarding position, orientation, transmit frequency range, ambient environment, and updated classifications may be needed responsive to any state changes, at least regarding changes of more than a threshold amount.

According to the method 900, the UE listens to (receives) SS/PDBCH transmissions for the surrounding BSs, using respective Rx beams of one or more of its antenna panels (Block 902). Here, the Rx beams may be wider than the beams used by the UE for radar transmissions but there is nonetheless a directional correspondence such that a given Rx beam corresponds to one or more particular ones of the radar beams.

The UE chooses the suitable SS/PDBCH blocks and indicates them to the corresponding BSs (Block 904). In other words, the UE identifies the SS/PDBCH transmissions that it received at greater than some defined minimum signal strength and it indicates that information to the respective BS or BSs. These identified SS/PDBCH transmissions correspond to respective ones of the Rx beams, which the UE then uses as a selected sweeping set for receiving CSI-RS from the BS or BSs associated with the identified SS/PDBCH transmissions (Block 906). The involved BS or BSs may transmit the CSI-RS using narrower beams than were used for transmission of the SS/PDBCH.

The UE registers (as current state information) relevant IMU information, estimated received power, rain condition, frequency range, and, if available, BS information, such as transmit power information to be used for pathloss estimations (Block 908). If the UE supports beam correspondence (UL/DL beam reciprocity) and knows the BS information needed for pathloss estimation (YES from Block 910), processing proceeds to the beam-training procedure labeled "A". If not, (NO from Block 910), processing proceeds to Block 912, where the UE selects the antenna panels for which there is a beam with minimum received estimated power that is higher than a threshold. From there, if the UE supports beam correspondence (YES from Block 914), processing proceeds to the beam-training procedure labeled "B". If not (NO from Block 914), the particular procedure taken for beam training depends on whether the BSs are operative to feedback UL received power measurements for all UL Tx beams used by the UE in beam training. If not (NO from Block 916), processing continues with the beam-training procedure labeled "C". If so (YES from Block 916), processing continues with the beam-training procedure labeled "D".

FIG. 9B illustrates the various beam-training procedures introduced in FIG. 9A. "Procedure A" corresponds to the case where the UE supports beam correspondence and has the BS information needed for pathloss estimation. Correspondingly, the UE classifies its radar beam directions as restricted or unrestricted in dependence on estimating its distance to each BS being considered (Block 918), based on the signal strength of DL reference signals received from the BS, as measured for each Rx beam direction used by the UE in a reception beam sweep. The UE then uses those signal-strength measurements to estimate the received signal strength that would be experienced at the BS for the Tx beams corresponding to the Rx beams (Block 920). The UE then uses those estimates to classify the respective Tx beams for each of the involved antenna panels of the US as restricted or unrestricted (Block 930).

Procedure B corresponds to the case where the UE does not support beam correspondence but where the involved BSs are operative to feedback UL received power measurements for all Tx beams used in the transmit beam sweep performed by the UE, but where the UE does not have the BS information needed for pathloss information. In Procedure B, the UE sweeps through the different UL Tx beams of each selected antenna panel while the corresponding BSs listen to the UL transmissions from the UE, in conjunction with sweeping through selected UL Rx beams (Block 926). The UE then receives feedback from the BSs indicating the UL received power measurements made by the BSs for the UL Tx beams (Block 928), and the UE classifies respective ones of the UL Tx beams as being restricted or unrestricted, based on the feedback (Block 930). Here, the UL Tx beams are the same as or correspond to the radar beam directions 30 used by the UE for radar sensing.

Procedure C represents a beam-training procedure that applies where the UE does not support beam correspondence and where the BSs are not operative to feedback UL received powers for all the UL Tx beams used by the UE in the beam-training sweep(s). In such cases, the UE uses the best-beam training approach (Block 932), e.g., as seen in FIG. 8.

Procedure D corresponds to a beam-training approach in a case where the UE supports beam correspondence but does not have the BS information needed to use pathloss information for estimating radar interference at the BSs. In this case, the UE transmits an UL reference signal, e.g., an SRS, via one UL Tx beam of each selected antenna panel (Block 922). The UE then uses the feedback returned from the involved BS(s) on the UL reference-signal transmissions, along with measurements made at the UE for DL CSI-RS transmissions received from the involved BS(s) on the DL Rx beams corresponding to the set of UL Tx beams being evaluated (Block 924), to estimate the signal strength that would be experienced at the BS(s) for the UL Tx beam directions. In other words, by knowing the signal strength experienced at a BS for one UL Tx beam from a given antenna panel, and knowing the signal strength experienced at the UE for the DL Rx beams of the panel that correspond to the other UL Tx beams of the panel, the UE can estimate the signal strengths that would be experienced at the BS for radar transmissions using the other UL Tx beams of the panel.

FIGS. 10A/B/C illustrate one embodiment of an overall method 1000 of operation by a UE, for detecting BSs that may be interfered with by radar transmissions by the UE and mitigating such interference.

The method 1000 includes the UE discovering nearby BSs and adds them to a list (Block 1002), UE performs a beam-training procedure, e.g., using any one of the approaches described earlier herein, and makes a list, denoted as a radar beam list, based on the received-signal powers at the BS (Block 1004). The UE performs the beam training for each next BS in the list of BSs being considered (NO from Block 1006). Once the UE has completed beam training with respect to all BSs being considered (YES from Block 1006), it defines an area of interest for radar scanning, e.g., defines the angular range or ranges of interest for radar scanning (Block 1008).

The UE then determines whether the radar-scanning area of interest involves using any radar beam directions 30 that are classified as restricted (interfering) beams (Block 1010).

If so, the UE adjusts the area of interest (Block 1008) and reassesses whether the area of interest for radar scanning implicates any restricted beam directions (Block 1010). If not, processing continues with the UE sending radar signals in the desired frequencies using the unrestricted beam directions, e.g., the UE transmits SRS for radar sensing during an UL phase of the wireless communication network that includes the BSs being considered (Block 1012).

Figure 10B:
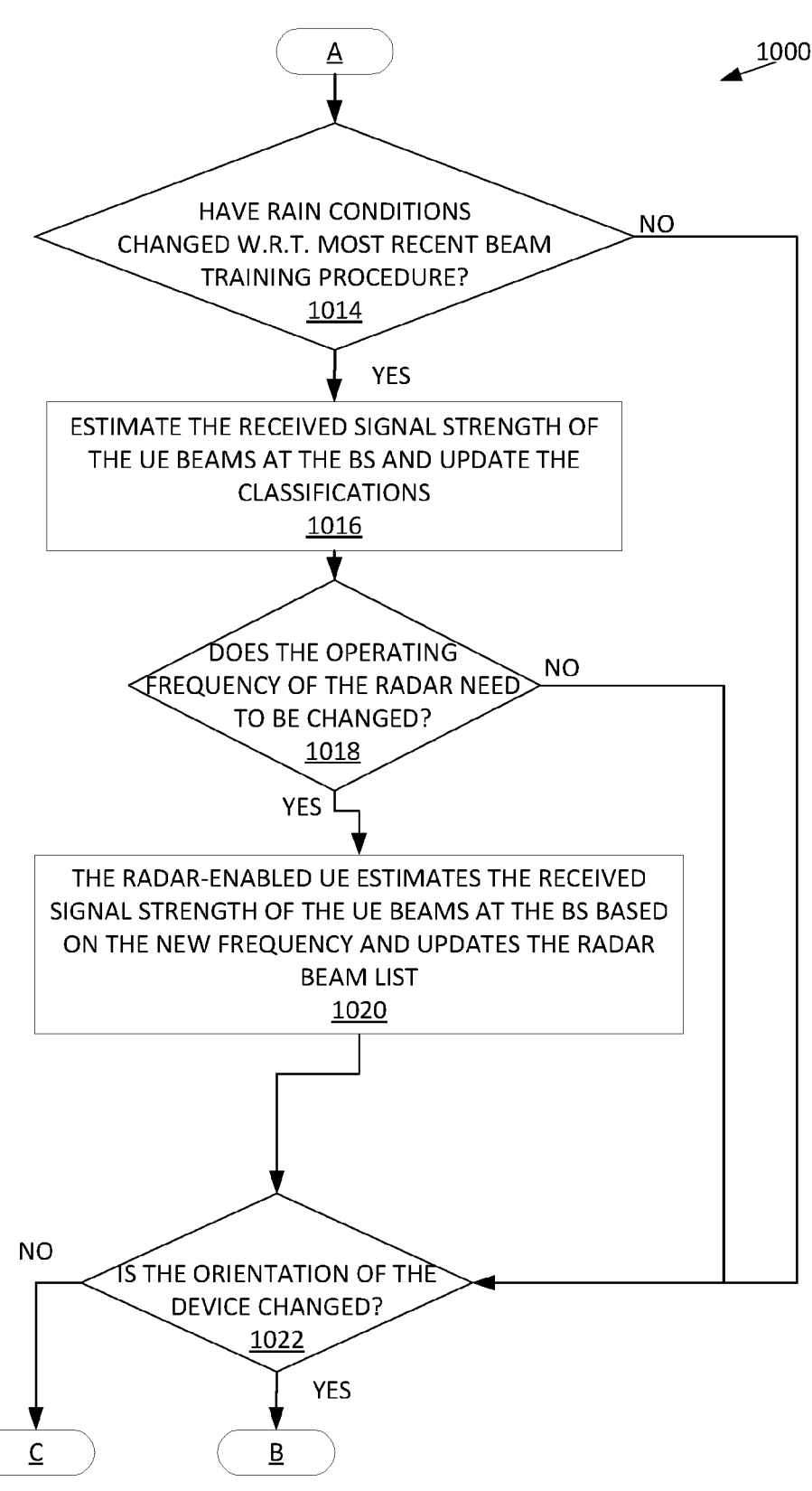

With reference to FIG. 10B and following path "A", processing continues with the UE evaluating whether the amount/presence of rain has changed (Block 1014), as compared to the conditions used during beam training for the most recent classification of the radar beam directions 30 as restricted or unrestricted. If so, the UE estimates the received-signal strengths at the BS(s) for the UL Tx beams and updates its classifications (Block 1016) and determines whether the operating frequency used for radar transmissions needs to be changed (Block 1018). If so, the UE updates its classifications based on the changed frequency (Block 1020)—e.g., it accounts for changes in atmospheric attenuation associated with the changed frequency.

The method 1000 also includes checking whether the orientation of the UE has changed with respect to the orientation prevailing at the most recent beam-training based classification (Block 1022). If so, processing continues at "B" and, if not, processing continues at "C".

Figure 10C:
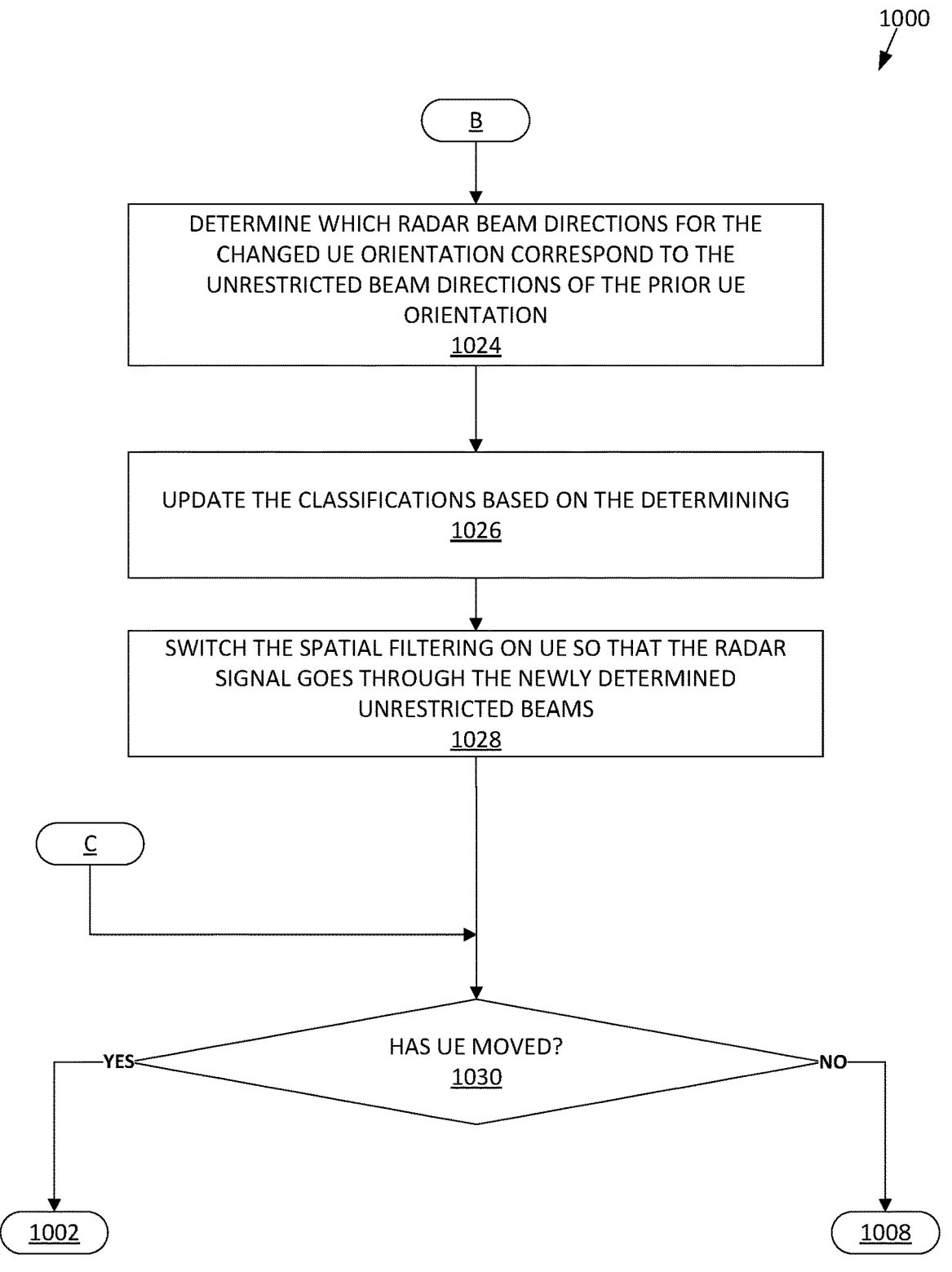

FIG. 10C illustrates that processing for path B (changed orientation of the UE) includes the UE determining which radar beam directions for the changed UE orientation correspond to the unrestricted beam directions of the prior orientation (Block 1024), and updating its restricted/unrestricted beam classifications, based on the determining (Block 1026). The UE then switches (updates) its spatial filtering so that the radar-signal transmissions use the newly determined unrestricted beams (Block 1028).

In an example scenario, the UE has a defined set of UL Tx beams that are fixed in terms of their relative directions from the UE. The absolute direction in free space of any one of these beams is defined by the orientation of the UE. Thus, the particular UL Tx beams that the UE may consider as being problematic in terms of radar transmissions depends on the current orientation of the UE. As the orientation of the UE changes, the particular UL Tx beams among the defined set that are considered problematic changes. As such, the UE may determine which UL Tx beams are problematic for a changed orientation, based on knowing the relative directions associated with the respective UL Tx beams and knowing how the orientation of the UE has changed, e.g., in terms of rotational angle(s).

Processing continues with determining whether the UE has moved (Block 1030), e.g., by more than a threshold amount, relative to its position (location) from the last beam classification procedure, the processing returns to Block 1002, as seen in FIG. 10A. If the UE has not moved, e.g., by more than a threshold amount, processing returns to Block 1008, as seen in FIG. 10A.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method of operation by a wireless communication device that communicates with a wireless communication network and performs radar transmissions for surrounding-environment sensing using a same or overlapping millimeter wave (mmW) frequency range, the method comprising:

classifying, for a current orientation and position of the wireless communication device, individual radar beam directions among a plurality of radar beam directions as being restricted or unrestricted, where any given radar beam direction is classified as being restricted based on known or estimated Uplink (UL) reception interference arising in the wireless communication network from radar transmissions by the wireless communication device in the given radar beam direction; and adapting radar transmissions by the wireless communication device in consideration of the classifications made for the individual radar beam directions, the adapting comprising muting or reducing radar-signal transmission power with respect to each restricted radar beam direction;

wherein the classifying comprises determining one or more radio network nodes of the wireless communication network to consider, and for each radio network node being considered and each radar beam direction being considered, estimating an UL received power that would be experienced at the considered radio network node for a radar transmission performed by the wireless communication device in the considered radar beam direction at a defined transmit power level.

2. The method of claim 1, further comprising repeating the classifying to update the classifications, in response to any one or more of: more than a threshold change in the orientation of the wireless communication device, more than a threshold change in the position of the wireless communication device, more than a threshold change in radar-signal frequency used by the wireless communication device for radar transmissions, and more than a threshold change in ambient conditions.

3. The method of claim 1, wherein estimating the UL received power that would be experienced at the considered radio network node for a radar transmission performed by the wireless communication device in the considered beam direction comprises receiving a Downlink (DL) reference signal via a DL beam direction that corresponds to the considered radar beam direction, estimating a pathloss based on a received-signal power of the DL reference signal, and estimating the UL received power from the pathloss and the defined transmit power level.

4. The method of claim 1, wherein the classifying includes the wireless communication device sweeping through defined beam directions for each of two or more antenna panels of the wireless communication device, the two or more antenna panels having different respective orientations.

5. The method of claim 1, wherein the wireless communication device estimates the UL received power that would be experienced at each considered radio network node based on feedback from each considered radio network node indicating, for each radar beam direction being considered, a received power at each considered radio network node of an UL reference signal transmitted by the UE.

6. The method of claim 5, wherein the UE transmits the UL reference signal in an UL transmission sweep from each of one or more antenna panels of the wireless communication device, each UL transmission sweep involving multiple UL beam directions corresponding to respective ones of the radar beam directions, wherein the feedback from each considered radio network node comprises UL received power estimates for the multiple UL beam directions of each UL transmission beam sweep.

7. The method of claim 6, wherein the wireless communication device estimates the UL received power that would be experienced at each considered radio network node for each radar beam direction being considered in joint dependence on the feedback received from each considered radio network node for each considered radar beam direction and a corresponding downlink (DL) received power measured by the wireless communication device during a reception beam sweep.

8. The method of claim 1, wherein the classifying includes, with respect to any radar beam direction classified as restricted, determining whether the radar beam direction should be considered as conditionally restricted, in dependence on a degree to which radar transmissions in the radar beam direction are estimated as interfering with UL reception in the wireless communication network, and wherein the method includes performing radar transmissions in radar beam directions that are conditionally restricted at lower transmission powers than are used by the wireless communication device for radar transmissions in radar beam directions that are unrestricted.

9. The method of claim 1, wherein the classifying depends on at least one of a criticality of UL communications vulnerable to radar interference by the wireless communication device, one or more Quality-of-Service (QoS) requirements of the UL communications vulnerable to radar interference by the wireless communication device, an estimated likelihood of UL communications occurring during a next performance of radar transmissions by the wireless communication device, and a position of the wireless communication device relative to one or more radio network nodes of the wireless communication network.

10. The method of claim 1, wherein the wireless communication device includes two or more antenna panels having different relative orientations and correspondingly different directionalities with respect to the current orientation of the wireless communication device, wherein each antenna panel supports one or more of the radar beam directions, and wherein the method includes determining which antenna panels are directionally relevant to particular radio network nodes of the wireless communication network, based on the current orientation of the wireless communication device.

11. A method performed by a radio network node of a wireless communication network, the method comprising:

receiving initiation signaling from a wireless communication device, requesting performance of a supporting procedure by the radio network node for assisting the wireless communication device in performing a radar beam classification procedure by which the wireless communication device classifies respective radar beam directions as restricted or unrestricted; and performing the supporting procedure responsive to receiving the initiation signaling, the supporting procedure comprising:

receiving Uplink (UL) reference-signal transmissions corresponding to respective UL transmit beam directions at the wireless communication device;

estimating UL received powers for the UL reference-signal transmissions; and sending feedback for the wireless communication device, the feedback indicating the UL received powers corresponding to one or more of the UL transmit beam directions.

12. The method of claim 11, wherein receiving the UL reference-signal transmissions corresponding to respective UL transmit beam directions at the wireless communication device comprises receiving one or more UL reference-signal transmissions from each of one or more antenna panels of the wireless communication device, where each UL transmit beam direction corresponds with a respective radar beam direction among a plurality of radar beam directions associated with radar transmissions used by the wireless communication device for surrounding-environment sensing, and where the UL reference-signal transmissions use a millimeter wave (mmW) frequency range that is the same as or overlaps with a frequency range used by the wireless communication device for the radar transmissions.

13. The method of claim 11, wherein receiving the UL reference-signal transmissions corresponding to respective UL transmit beam directions at the wireless communication device comprises performing a receive beam sweep using multiple UL receive beam directions, recording UL received powers for best pairings of the multiple UL transmit beam directions and the multiple UL receive beam directions, and sending, as the feedback, the recorded UL received powers to the wireless communication device.

14. The method of claim 11, wherein receiving the UL reference-signal transmissions corresponding to respective UL transmit beam directions at the wireless communication device comprises performing a receive beam sweep using multiple UL receive beam directions, recording UL received powers for best pairings of the multiple UL transmit beam directions and the multiple UL receive beam directions, and sending, as the feedback, the recorded UL received power of a best pairing between the UL transmit beam directions and the UL receive beam directions.

15. A wireless communication device comprising:
communication circuitry configured for communicating with a wireless communication network and performing radar transmissions for surrounding-environment sensing using a same or overlapping millimeter wave (mmW) frequency range; and
processing circuitry operatively associated with the communication circuitry and configured to:
classify, for a current orientation and position of the wireless communication device, individual radar beam directions among a plurality of radar beam directions as being restricted or unrestricted, where any given radar beam direction is classified as being restricted based on known or estimated Uplink (UL) reception interference arising in the wireless communication network from radar transmissions by the wireless communication device in the given radar beam direction; and
adapt radar transmissions by the wireless communication device in consideration of the classifications made for the individual radar beam directions, the adapting comprising muting or reducing radar-signal transmission power with respect to each restricted radar beam direction;
wherein the classifying comprises determining one or more radio network nodes of the wireless communication network to consider, and for each radio network node being considered and each radar beam direction being considered, estimating an UL received power that would be experienced at the considered radio network node for a radar transmission performed by the wireless communication device in the considered radar beam direction at a defined transmit power level.

16. The wireless communication device of claim 15, wherein the processing circuitry is configured to repeat the classifying to update the classifications, in response to any one or more of: more than a threshold change in the orientation of the wireless communication device, more than a threshold change in the position of the wireless communication device, more than a threshold change in radar-signal frequency used by the wireless communication device for radar transmissions, and more than a threshold change in ambient conditions.

17. The wireless communication device of claim 15, wherein, to estimate the UL received power that would be experienced at the considered radio network node for a radar transmission performed by the wireless communication device in the considered beam direction, the processing circuitry is configured to estimate a pathloss based on a received-signal power of a Downlink (DL) reference signal received by the wireless communication device via a DL beam direction that corresponds to the considered radar beam direction, and estimate the UL received power from the pathloss and the defined transmit power level.

18. The wireless communication device of claim 15, wherein, to perform the classifying, the processing circuitry is configured to sweep through defined beam directions for each of two or more antenna panels of the wireless communication device, the two or more antenna panels having different respective orientations.

19. A radio network node configured for operation in a wireless communication network, the radio network node comprising:
communication circuitry; and
processing circuitry configured to:
receive, via the communication circuitry, initiation signaling from a wireless communication device, requesting performance of a supporting procedure by the radio network node for assisting the wireless communication device in performing a radar beam classification procedure by which the wireless communication device classifies respective radar beam directions as restricted or unrestricted; and
perform the supporting procedure responsive to receiving the initiation signaling, the supporting procedure comprising:
receive, via the communication circuitry, Uplink (UL) reference-signal transmissions corresponding to respective UL transmit beam directions at the wireless communication device;
estimate UL received powers for the UL reference-signal transmissions; and
send, via the communication circuitry, feedback for the wireless communication device, the feedback indicating the UL received powers corresponding to one or more of the UL transmit beam directions.

20. The radio network node of claim 19, wherein the UL reference-signal transmissions comprise one or more UL reference-signal transmissions from each of one or more antenna panels of the wireless communication device, where each UL transmit beam direction corresponds with a respective radar beam direction among a plurality of radar beam directions associated with radar transmissions used by the wireless communication device for surrounding-environment sensing, and where the UL reference-signal transmissions use a millimeter wave (mmW) frequency range that is the same as or overlaps with a frequency range used by the wireless communication device for the radar transmissions.

* * * * *